(12) United States Patent
Centonza et al.

(10) Patent No.: US 10,674,426 B2
(45) Date of Patent: Jun. 2, 2020

(54) PROVIDING COMMUNICATION FOR A MOBILE COMMUNICATION DEVICE USING A CENTRAL UNIT NODE AND DISTRIBUTED UNIT NODES

(71) Applicant: Telefonaktiebolaget LM Ericsson (publ), Stockholm (SE)

(72) Inventors: Angelo Centonza, Stockholm (SE); Torsten Dudda, Aachen (DE); Matteo Fiorani, Solna (SE); Gunnar Mildh, Sollentuna (SE); Henning Wiemann, Aachen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 17 days.

(21) Appl. No.: 15/765,030

(22) PCT Filed: Dec. 21, 2017

(86) PCT No.: PCT/SE2017/051325
§ 371 (c)(1),
(2) Date: Mar. 30, 2018

(87) PCT Pub. No.: WO2018/169462
PCT Pub. Date: Sep. 20, 2018

(65) Prior Publication Data
US 2019/0059039 A1 Feb. 21, 2019

Related U.S. Application Data

(60) Provisional application No. 62/471,315, filed on Mar. 14, 2017.

(51) Int. Cl.
*H04W 72/04* (2009.01)
*H04W 40/22* (2009.01)
(Continued)

(52) U.S. Cl.
CPC .......... *H04W 40/22* (2013.01); *H04W 76/15* (2018.02); *H04W 76/19* (2018.02); *H04W 76/25* (2018.02); *H04W 88/085* (2013.01)

(58) Field of Classification Search
CPC ..... H04W 40/22; H04W 76/25; H04W 76/15; H04W 76/19; H04W 88/085
See application file for complete search history.

(56) References Cited

U.S. PATENT DOCUMENTS

2014/0155066 A1* 6/2014 Guo .................. H04B 1/74
455/436
2015/0223127 A1* 8/2015 Godin .................. H04W 36/30
370/331
(Continued)

FOREIGN PATENT DOCUMENTS

EP 3131362 A1 2/2017
EP 3468251 A1 * 4/2019
(Continued)

OTHER PUBLICATIONS

"Technical Specification Group Services and System Aspects; General Packet Radio Service (GPRS) enhancements for Evolved Universal Terrestrial Radio Access Network (E-UTRAN) access," (Release 14), 3GPP TS 23.401 V14.3.0 (Mar. 2017) 386 pages.
(Continued)

*Primary Examiner* — Hassan Kizou
*Assistant Examiner* — Mahbubul Bar Chowdhury
(74) *Attorney, Agent, or Firm* — Sage Patent Group

(57) ABSTRACT

A method may be provided to operate a CU node that is coupled with first and second DU nodes. Communication is provided between the CU node and a mobile communication device through the first DU node over a first radio link. A message is received at the CU node from the first DU node that the radio link is temporarily unavailable. Responsive to receiving the message, communication between the CU
(Continued)

node and the mobile communication device through the first DU node is suspended, wherein configuration of the first DU node to serve the mobile communication device using the first radio link is maintained. While suspending communication between the CU node and the mobile communication device through the first DU node, communication may be provided between the CU node and the mobile communication device through the second DU node over a second radio link.

22 Claims, 14 Drawing Sheets

(51) Int. Cl.
*H04W 76/15* (2018.01)
*H04W 76/25* (2018.01)
*H04W 76/19* (2018.01)
*H04W 88/08* (2009.01)

(56) References Cited

U.S. PATENT DOCUMENTS

| | | | | |
|---|---|---|---|---|
| 2015/0312810 A1* | 10/2015 | Yasuda | ............... | H04W 36/08 370/338 |
| 2016/0212661 A1* | 7/2016 | Basu Mallick | ....... | H04L 1/1614 |
| 2017/0332371 A1* | 11/2017 | Kubota | ............... | H04B 7/0621 |
| 2018/0083688 A1* | 3/2018 | Agiwal | ............... | H04M 3/537 |
| 2019/0037522 A1* | 1/2019 | Tenny | ............... | H04W 76/36 |

FOREIGN PATENT DOCUMENTS

| | | |
|---|---|---|
| WO | WO 2015/060543 A1 | 4/2015 |
| WO | WO 2015/119411 A1 | 8/2015 |

OTHER PUBLICATIONS

"Technical Specification Group Radio Access Network; Evolved Universal Terrestrial Radio Access (E-UTRA) and Evolved Universal Terrestrial Radio Access Network (E-UTRAN); Overall description; Stage 2," (Release 14), 3GPP TS 36.300 V14.1.0 (Dec. 2016) 317 pages.

"Technical Specification Group Radio Access Network; Study on New Radio Access Technology; Radio Access Architecture and Interfaces," (Release 14), 3GPP TR 38.801 V1.2.0 (Feb. 2017) 90 pages.

"Technical Specification Group Radio Access Network; Study on Small Cell enhancements for E-UTRA and E-UTRAN; Higher layer aspects," (Release 12), 3GPP TR 36.842 V12.0.0 (Dec. 2013) 71 pages.

"Technical Specification Group Radio Access Network; Scenarios and requirements for small cell enhancements for E-UTRA and E-UTRAN," (Release 13), 3GPP TR 36.932 V13.0.0 (Dec. 2015) 14 pages.

International Search Report and Written Opinion of the International Searching Authority, PCT/SE2017/051325, dated Mar. 14, 2018, 10 pages.

* cited by examiner

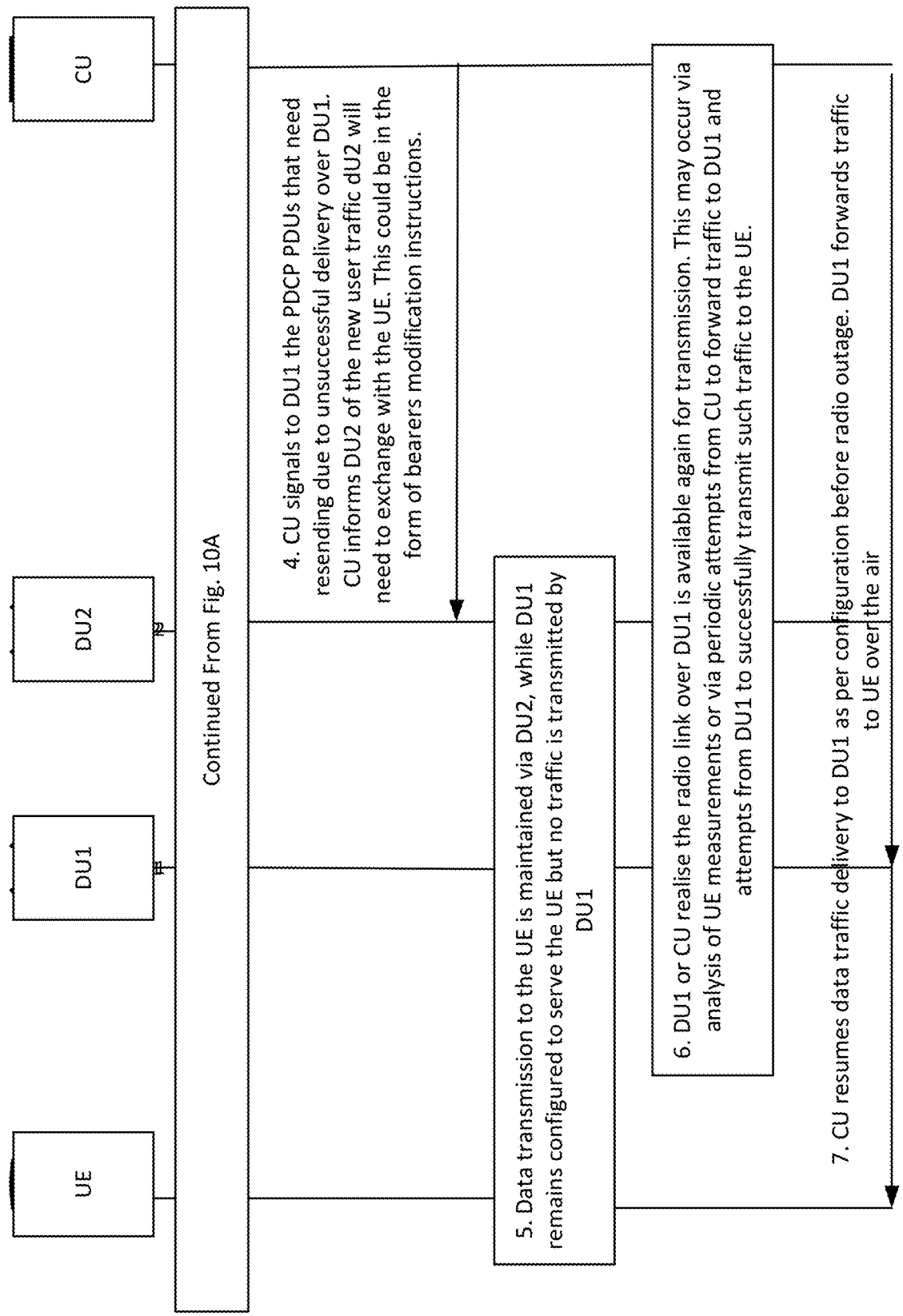

PROVIDING COMMUNICATION FOR A MOBILE COMMUNICATION DEVICE USING A CENTRAL UNIT NODE AND DISTRIBUTED UNIT NODES

This application is a 35 U.S.C. § 371 national stage application of PCT International Application No. PCT/SE2017/051325 filed on Dec. 21, 2017, which in turns claims domestic priority to U.S. Provisional Patent Application No. 62/471,315, filed on Mar. 14, 2017, the disclosures and content of which are incorporated by reference herein in their entirety.

TECHNICAL FIELD

The present disclosure relates to generally relates to the field of communications, and more particularly, to methods and nodes providing wireless network communications.

BACKGROUND

Evolved Packet System (EPS) is the Evolved 3GPP Packet Switched Domain and includes Evolved Packet Core (EPC) and Evolved Universal Terrestrial Radio Access Network (E-UTRAN).

FIG. 1 is an overview of the EPC architecture. This architecture is defined in 3GPP TS 23.401, which provides definitions of the PGW (PDN Gateway), SGW (Serving Gateway), PCRF (Policy and Charging Rules Function), MME (Mobility Management Entity), and mobile device (UE). The LTE radio access, E-UTRAN, includes one more eNBs (also referred to as base stations). FIG. 1 illustrates non-roaming EPC architecture for 3GPP accesses.

FIG. 2 shows an overall E-UTRAN architecture and is further defined, for example, in 3GPP TS 36.300. The E-UTRAN includes eNBs, providing the E-UTRA user plane (PDCP/RLC/MAC/PHY) and control plane (RRC in addition to the user plane protocols) protocol terminations towards the UE. The eNBs are interconnected with each other by means of the X2 interface. The eNBs are also connected by means of the S1 interface to the EPC (Evolved Packet Core), more specifically to the MME (Mobility Management Entity) by means of the S1-MME interface and to the Serving Gateway (S-GW) by means of the S1-U interface.

Portions of the EPC Control Plane (CP) and User Plane (UP) architectures are shown in FIGS. 3 and 4. FIG. 3 illustrates the EPC Control Plane protocol architecture, and FIG. 4 illustrates the EPC User Plane protocol architecture.

LTE Dual Connectivity is a solution standardized in 3GPP Rel-12 to support UEs connecting to multiple carriers to send receive data on multiple carriers at the same time. Below is an overview description and more details can be found in 3GPP TS 36.300.

E-UTRAN supports Dual Connectivity (DC) operation whereby a multiple Rx/Tx UE in RRC_CONNECTED is configured to utilize radio resources provided by two distinct schedulers, located in two eNBs connected via a non-ideal backhaul over the X2 interface (see TR 36.842 and TR 36.932). The overall E-UTRAN architecture as specified in previous section and depicted in FIG. 2 is applicable for DC as well. eNBs involved in DC for a certain UE may assume two different roles: an eNB may either act as an MeNB (Master eNB) or as an SeNB (Secondary eNB). In DC, a UE is connected to one MeNB and one SeNB.

In DC, the radio protocol architecture that a particular bearer uses depends on how the bearer is setup. Three bearer types exist: MCG (Master Cell Group) bearer, SCG (Secondary Cell Group) bearer and split bearer. Those three bearer types are illustrated in FIG. 5 which illustrates Radio Protocol Architecture for Dual Connectivity. RRC is located in MeNB and SRBs (Signaling Radio Bearers) are always configured as MCG bearer type and therefore only use the radio resources of the MeNB. Note that DC can also be described as having at least one bearer configured to use radio resources provided by the SeNB.

Inter-eNB control plane signaling for DC is performed by means of X2 interface signaling. Control plane signaling towards the MME is performed by means of S1 interface signaling.

There is only one S1-MME connection per DC UE between the MeNB and the MME. Each eNB should be able to handle UEs independently, i.e. provide the PCell to some UEs while providing SCell(s) for SCG to others. Each eNB involved in DC for a certain UE controls its radio resources and is primarily responsible for allocating radio resources of its cells. Respective coordination between MeNB and SeNB is performed by means of X2 interface signaling.

FIG. 6 shows C-plane connectivity of eNBs involved in DC for a certain UE: the S1-MME is terminated in MeNB, and the MeNB and the SeNB are interconnected via X2-C. FIG. 6 illustrates C-Plane connectivity of eNBs involved in Dual Connectivity For dual connectivity, two different user plane architectures are allowed: one in which the S1-U only terminates in the MeNB and the user plane data is transferred from MeNB to SeNB using the X2-U, and a second architecture where the S1-U can terminate in the SeNB. FIG. 7 illustrates different U-plane connectivity options of eNBs involved in DC for a certain UE. Different bearer options can be configured with different user plane architectures. U-plane connectivity depends on the bearer option configured:

- For MCG bearers, the S1-U connection for the corresponding bearer(s) to the S-GW is terminated in the MeNB. The SeNB is not involved in the transport of user plane data for this type of bearer(s) over the Uu.
- For split bearers, the S1-U connection to the S-GW is terminated in the MeNB. PDCP data is transferred between the MeNB and the SeNB via X2-U. The SeNB and MeNB are involved in transmitting data of this bearer type over the Uu.
- For SCG bearers, the SeNB is directly connected with the S-GW via S1-U. The MeNB is not involved in the transport of user plane data for this type of bearer(s) over the Uu.

FIG. 7 illustrates U-Plane connectivity of eNBs involved in Dual Connectivity. Note that if only MCG and split bearers are configured, there is no S1-U termination in the SeNB.

The SeNB Addition procedure is initiated by the MeNB and is used to establish a UE context at the SeNB in order to provide radio resources from the SeNB to the UE. This procedure is used to add at least the first cell (PSCell) of the SCG. FIG. 8 shows the SeNB Addition procedure.

Due to variable radio channel quality between an eNB and a UE, a temporary interruption in data traffic may occur. Accordingly, there continues to exist a demand for methods to accommodate such temporary interruptions.

SUMMARY

According to some embodiments of inventive concepts, a method may be provided to operate a central unit (CN) node that is coupled with first and second distributed unit (DU)

nodes. The method may include providing communication between the CU node and a mobile communication device through the first DU node over a first radio link between the first DU node and the mobile communication device. A message may be received at the CU node from the first DU node to inform the CU node that the radio link is temporarily unavailable. Responsive to receiving the message that the first radio link is temporarily unavailable, communication between the CU node and the mobile communication device through the first DU node may be suspended, wherein configuration of the first DU node to serve the mobile communication device using the first radio link is maintained while suspending communication between the CU node and the mobile communication device through the first DU node. While suspending communication between the CU node and the mobile communication device through the first DU node, communication may be provided between the CU node and the mobile communication device through the second DU node over a second radio link between the second DU node and the mobile communication device.

According to some other embodiments of inventive concepts, a method may be provided to operate a first distributed unit (DU) node, wherein a central unit (CU) node is coupled with the first DU node and a second distributed unit (DU) node. The method may include providing communication between the CU node and a mobile communication device through the first DU node using a first radio link between the DU node and the mobile communication device. Conditions of the first radio link used by the first DU node to provide communication between the CU node and the mobile communication device may be monitored. Responsive to determining that the radio link is temporarily unavailable based on the monitoring, a message may be transmitted to the CU node to inform the CU node that the radio link is temporarily unavailable. Responsive to instructions received from the CU node after transmitting the message, communication between the CU node and the mobile communication device through the first DU node may be suspended, wherein configuration of the first DU node to serve the mobile communication device using the first radio link is maintained while suspending communication between the CU node and the mobile communication device through the first DU node.

Further embodiments of inventive concepts include central unit and distributed unit nodes implementing the methods recited above.

According to some embodiments disclosed herein, a fast suspension and/or resumption of data traffic transmission may be provided for a radio link subject to temporary interruption. For example, a temporarily failed radio link may be suspended, undelivered data traffic may be retransmitted to a UE via a new radio link, and use of the suspended radio link may be resumed once the quality of the suspended radio link has improved.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIGS. 10A and 10B illustrate a message diagram according to some embodiments of inventive concepts;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

Figure 1:
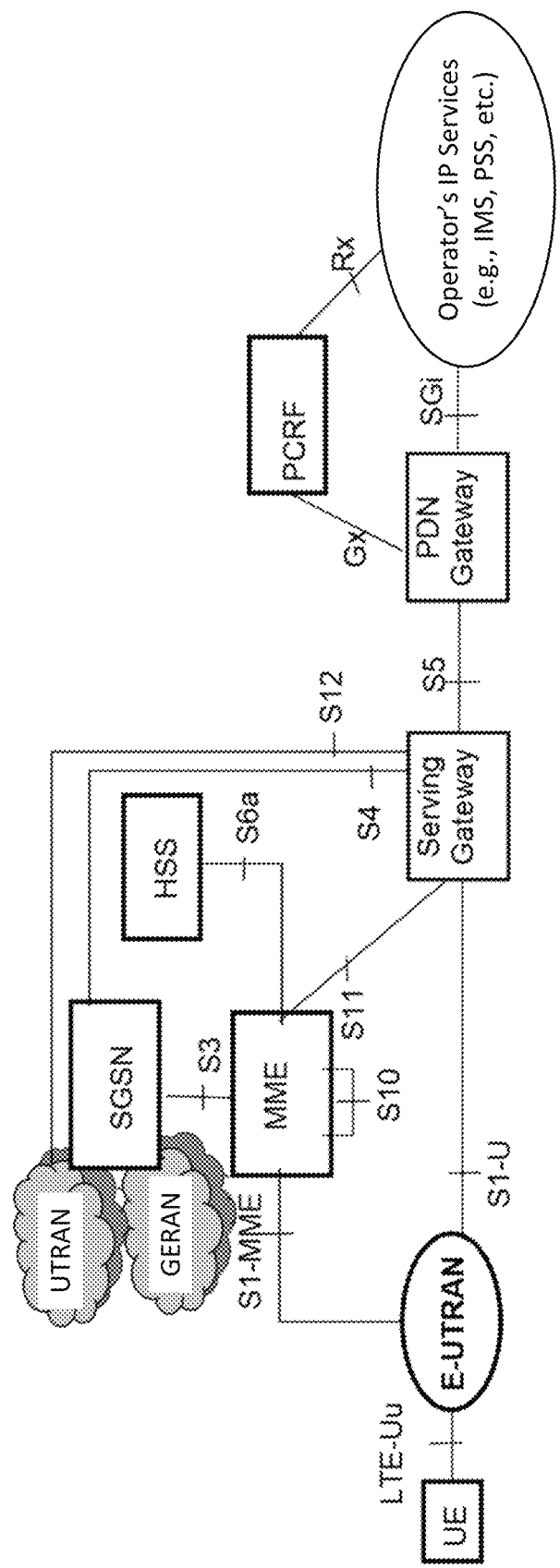
FIG. 1 is a block diagram illustrating a non-roaming architecture for 3GPP accesses.
Figure 2:
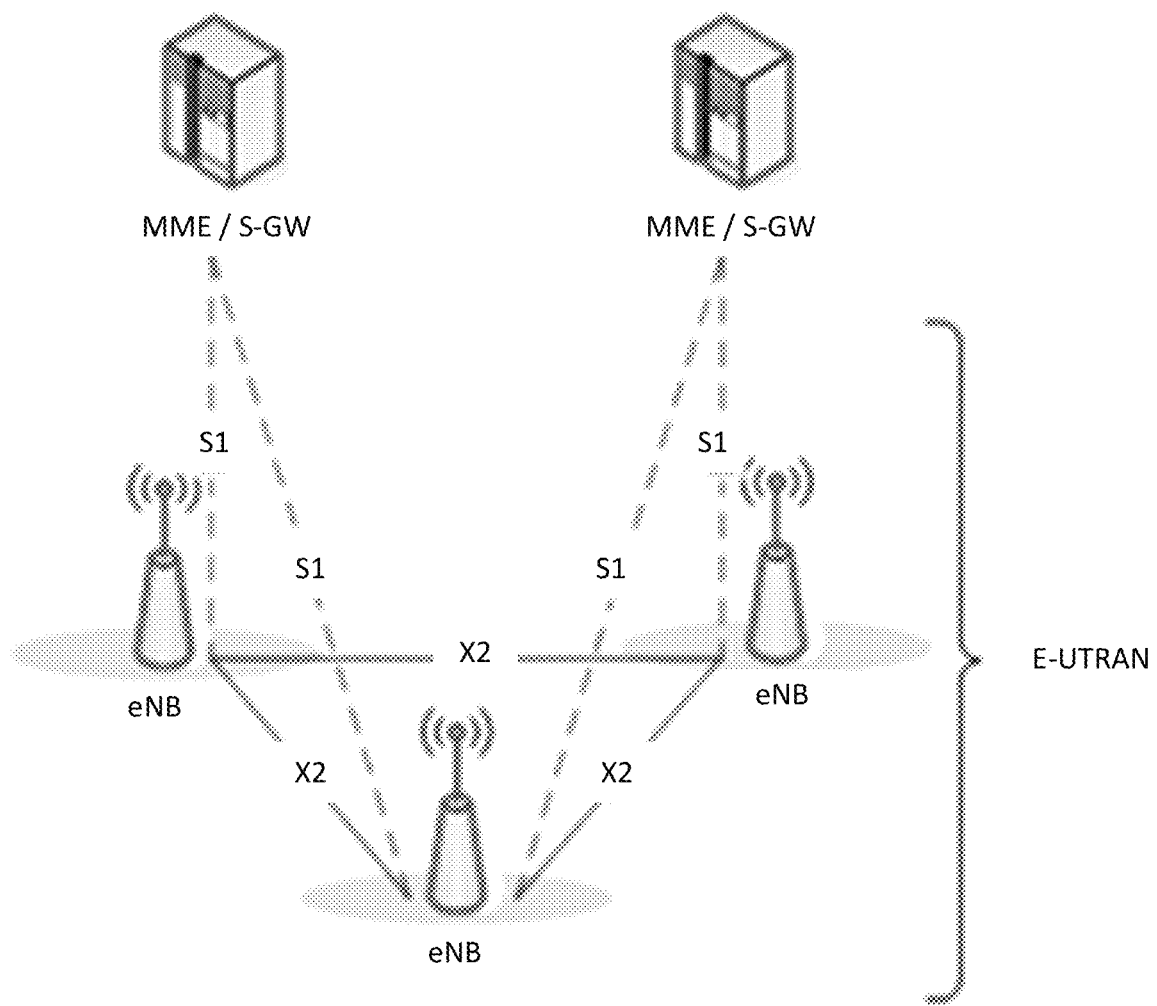
FIG. 2 is a block diagram illustrating an overall E-UTRAN architecture.
Figure 3:
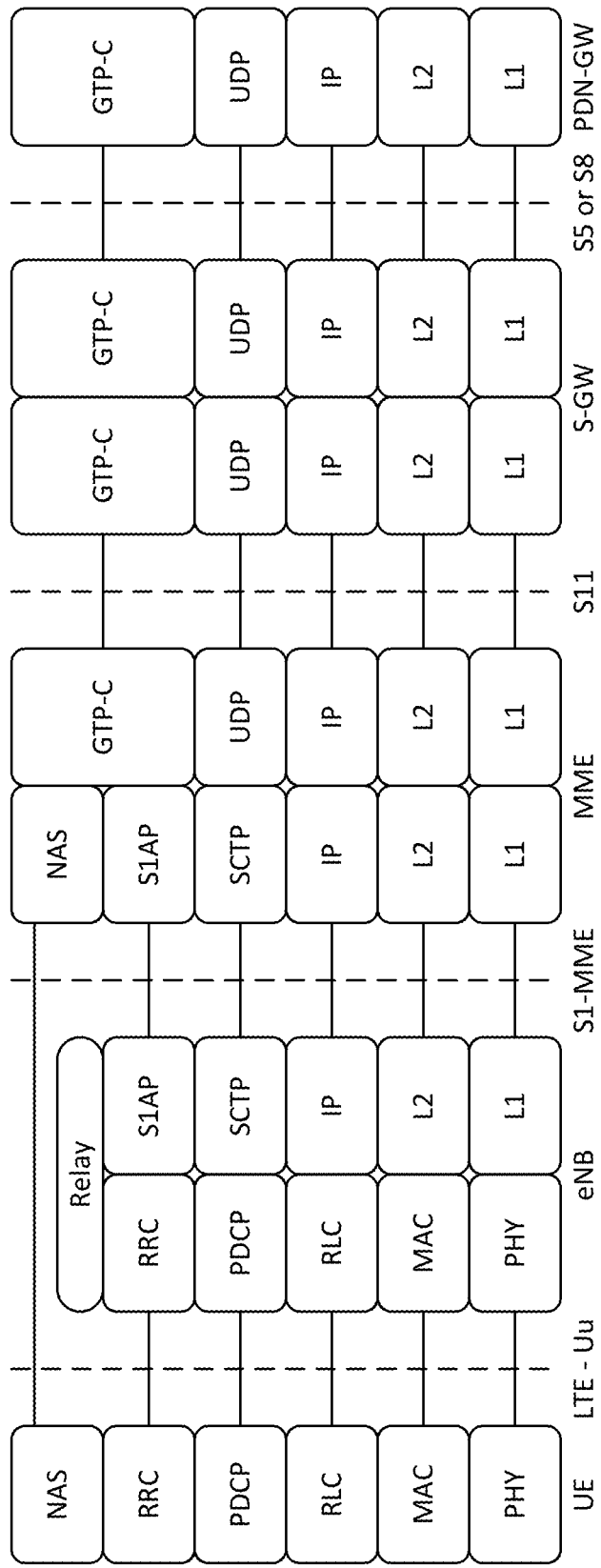
FIG. 3 is a diagram illustrating an EPC Control Plane Protocol architecture.
Figure 4:
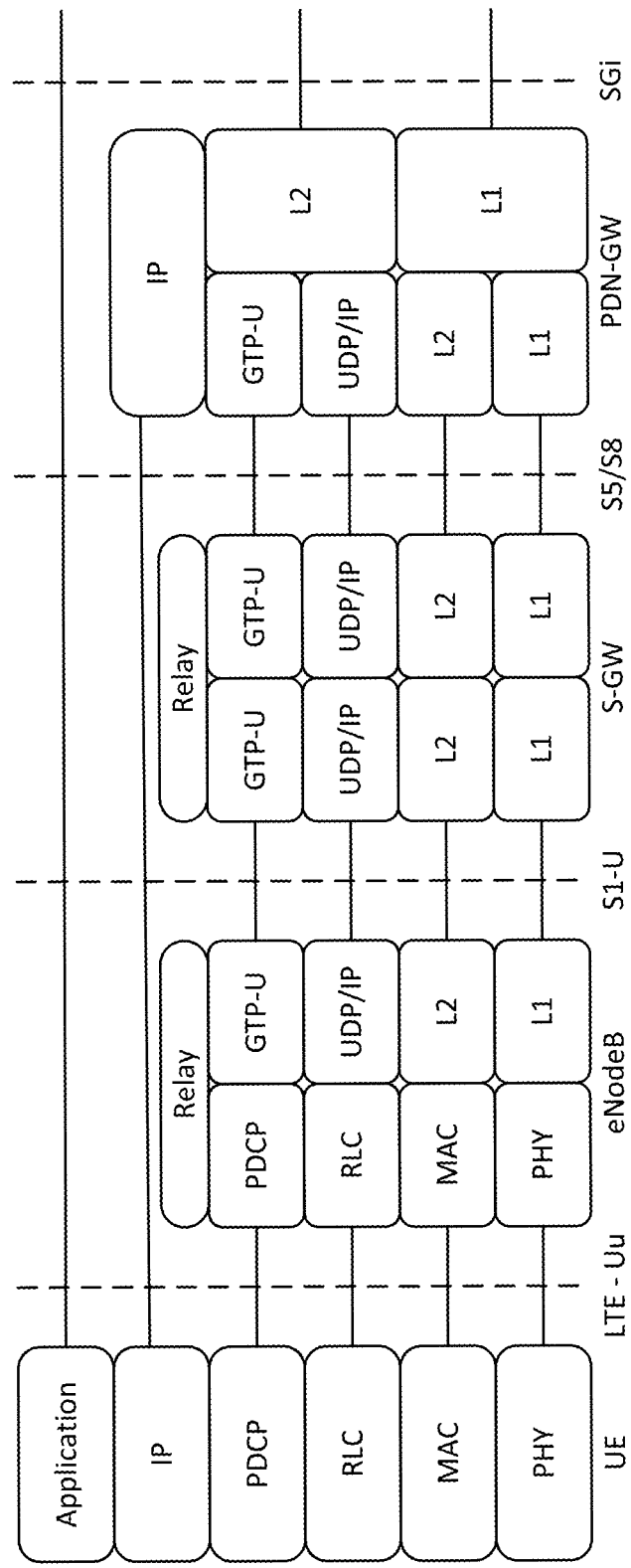
FIG. 4 is a diagram illustrating an EPC User Plane Protocol architecture.
Figure 5:
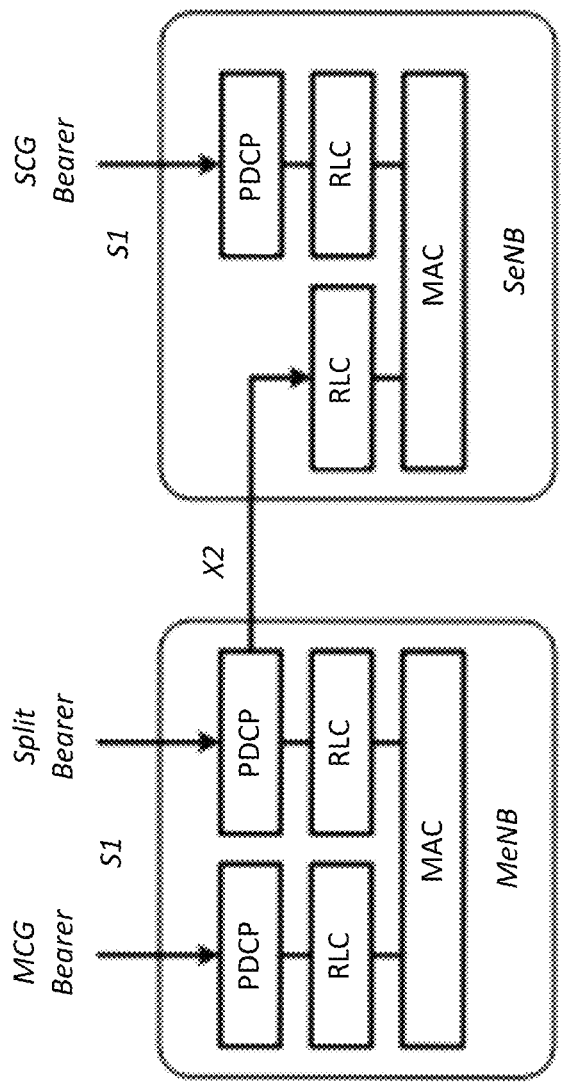
FIG. 5 is a block diagram illustrating a radio protocol architecture for dual connectivity.
Figure 6:
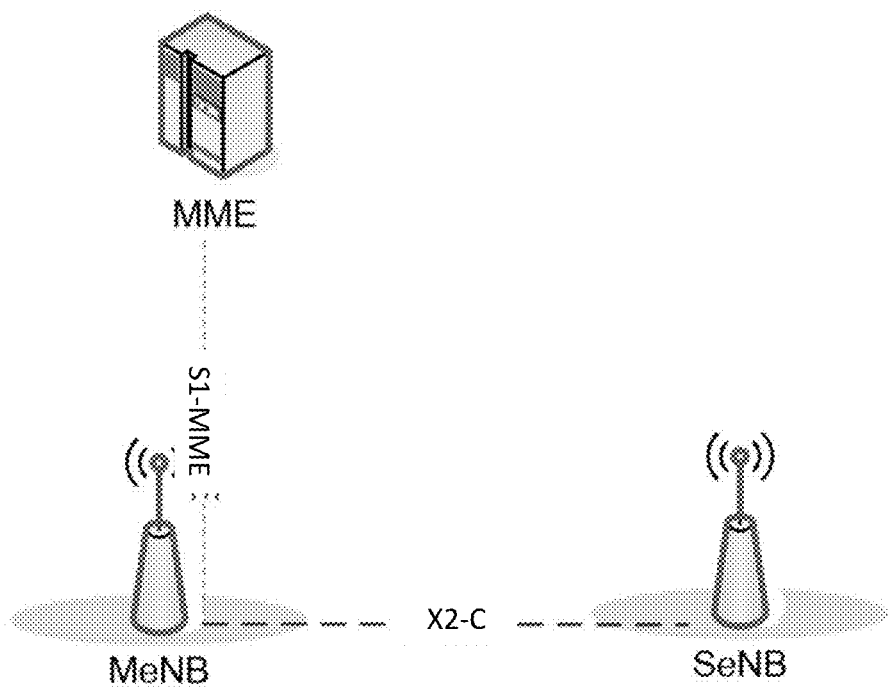
FIG. 6 is a diagram illustrating C-Plane connectivity of eNBs involved in dual connectivity.
Figure 7:
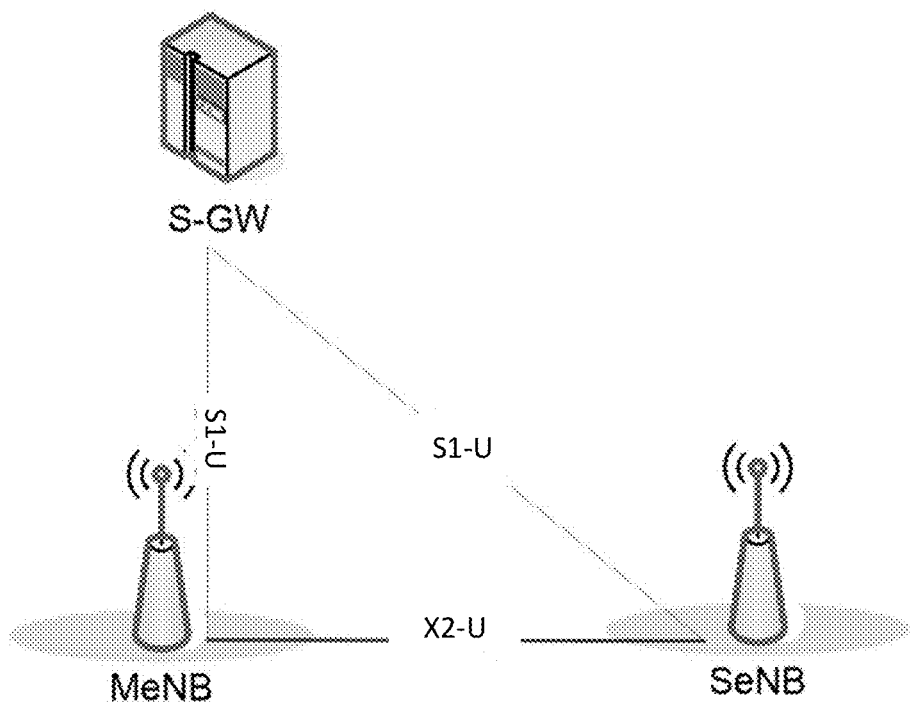
FIG. 7 is a diagram illustrating U-Plane connectivity of eNBs involved in dual connectivity.
Figure 8:
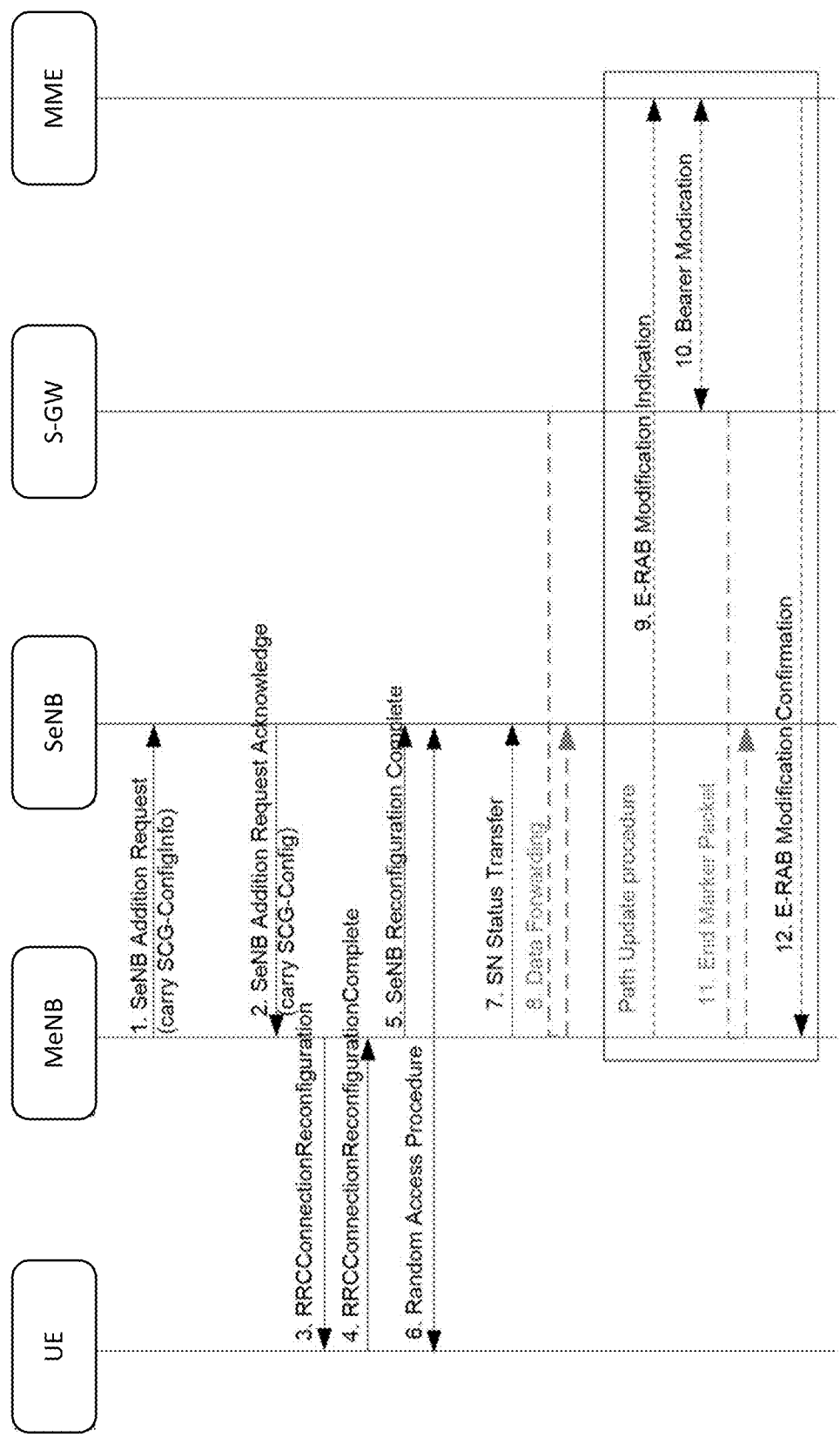
FIG. 8 is a message diagram illustrating SeNB Addition procedure.
Figure 9:
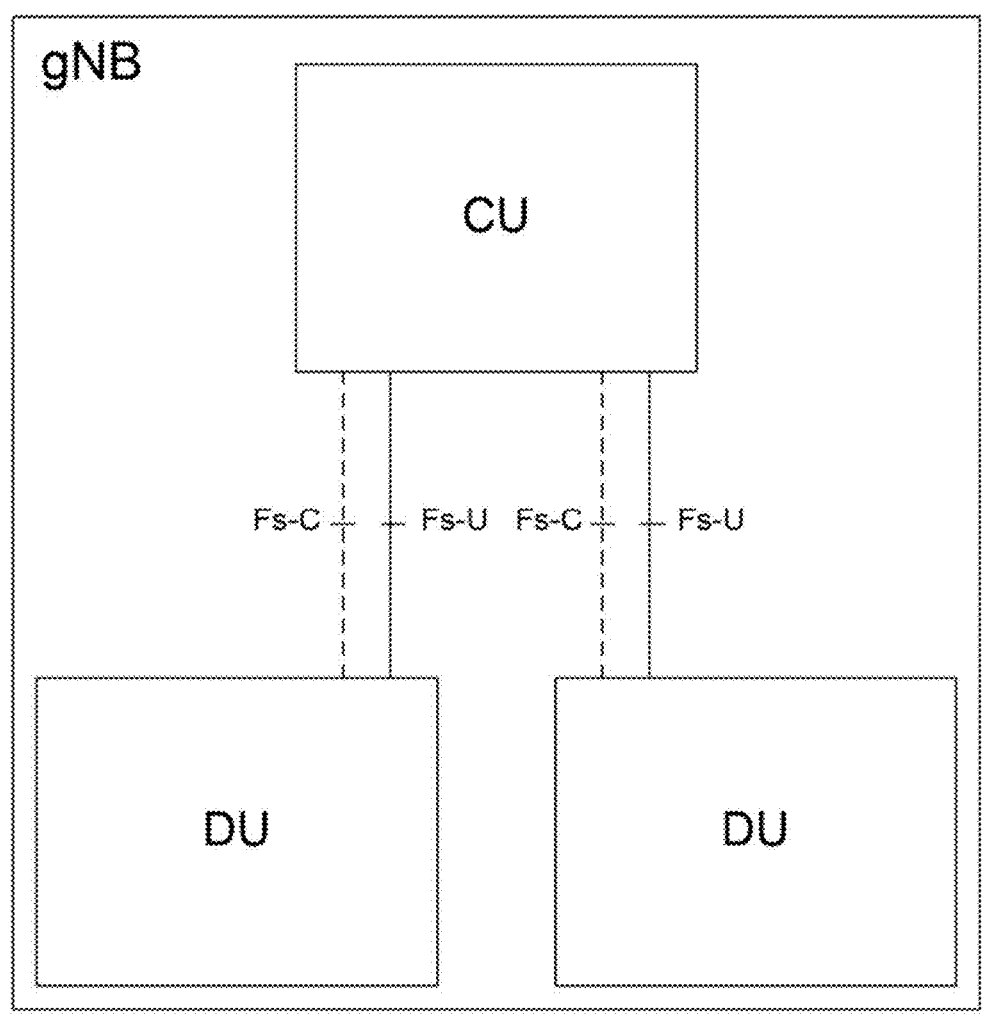
FIG. 9 is a block diagram illustrating RAN logical nodes according to some embodiments of inventive concepts.

As part of work ongoing in 3GPP on 5G RAN architectures, a new set of RAN logical nodes is under discussion as shown in FIG. 9. In TR38.801 v1.2.0 the following is captured to describe such new RAN architecture:

"Central Unit (CU): a logical node that includes the gNB functions as listed in section 6.2 excepting those functions allocated exclusively to the DU. CU controls the operation of DUs.

Distributed Unit (DU): a logical node that includes, depending on the functional split option, a subset of the gNB functions. The operation of DU is controlled by the CU."

The quote above reports two new logical nodes, one is a centralized unit (CU), also referred to as a CU node, hosting high layer protocols, the other is a decentralized unit (DU), also referred to as a DU node, hosting low layer protocols. As used herein, the terms central unit and centralized unit are used interchangeably, and the terms distributed unit and decentralized unit are used interchangeability.

A CU may host protocols such as RRC (Radio Resource Control) and PDCP (Packet Data Convergence Protocol), while a DU may host protocols such as RLC (Radio Link Control), MAC (Medium Access Control) and PHY (Physical Layer).

Other variants of protocol distributions between CU and DU exist, such as hosting the RRC, PDCP and part of the RLC protocol in the CU (in particular hosting the Automatic Retransmission Request (ARQ) function in the CU), while hosting the remaining parts of the RLC protocol with MAC and PHY in the DU. With some embodiments herein, the CU is assumed to host RRC and PDCP, where PDCP is assumed to handle both UP traffic and CP traffic. Nevertheless, embodiments herein may be applied to any other protocol split that may be achieved by hosting certain protocols in the CU and certain others in the DU. Embodiments herein may also cover a case where the centralized control plane protocols (e.g., PDCP-C and RRC) are located in a different CU with respect to the centralized user plane protocols (e.g., PDCP-U).

In the architecture identified by CUs and DUs dual connectivity may be achieved by means of allowing a UE (also referred to as a mobile communication device, a mobile device, a wireless device, etc.) to connect to multiple DUs served by the same CU or by allowing a UE to connect to multiple DUs served by different CUs.

In a scenario where a UE is served by radio links subject to fast fading, it is possible that some of the traffic transmitted to the UE over the air is not successfully delivered to the UE because of poor radio quality over the link. In this case, the radio link may be subject to a "blocking" event and be out of operation for a certain amount of time. After such time window, the radio link may become good enough in radio quality again and therefore it might be capable to successfully deliver traffic to the UE.

The scenario described could be one where a UE is served by a single radio link or one such as dual connectivity where the UE is served by multiple links.

In such scenario, the traffic not delivered to the UE because of fading or blocking of a serving radio link may need to be re-transmitted to the UE via an alternative radio link. Failure to do so may expose a data loss to the TCP (Transmission Control Protocol) layer, which in turn may reduce data throughput as part of a congestion management mechanisms.

On top of resending undelivered traffic to the UE, another problem may be to establish user data transmission via a suitable radio link. It may therefore be needed to quickly resend undelivered traffic to any radio link available for the UE and to forward user data to a suitable radio link for as long as the failed radio link does not recover its radio quality. So, in summary, there may be two decisions to be taken:

1) Decide whether said serving radio link experiences radio link problems that should be addressed by using another radio link; and 2) Decide which data packets to transmit via the other radio link.

Embodiments of inventive concepts may be applied to any radio technology where centralized management of data traffic may be advantageous. According to some embodiments, a DU may be enabled to detect whether a radio link is properly functioning or whether there is likelihood of some user data not being successfully delivered to the UE. In this case, the DU and the CU can engage into a signaling exchange that determines whether data traffic delivery over the DU shall be suspended in favor of delivery over another DU and to decide whether and how undelivered data traffic shall be sent via a different DU.

The DU in charge of the radio link subject to blocking may contact its serving CU with information about the data traffic that is assumed not to have been delivered to the UE. The DU also indicates to the CU that the radio link with the UE is temporary unavailable. This signaling from the DU is intended to let the CU decide whether to remove the radio link served by the DU or whether to "suspend" data traffic delivery over said DU, until radio conditions resume to sufficiently good levels.

The CU, provided that an alternative radio link is available to serve the UE, suspends transmission of data traffic over the first DU, while keeping the first DU as a serving DU for the UE (namely the first DU is still kept as a Secondary node as per dual connectivity terminology), and forwards undelivered data traffic on a second radio link and it switches transmission of data traffic previously scheduled for the first DU to a second DU serving the other available radio link.

When the first radio link again becomes sufficiently good in quality, such knowledge being acquired in a number of ways such as via UE measurements or via periodic attempts to deliver data traffic over the first radio link, the CU switches back forwarding of data traffic to the first DU as per the previous configuration (at the time when the radio link was good). Namely, in light of the fact that the first DU was not removed as a serving DU for the UE and the L2 and L1 of the first DU remained configured to serve the UE, despite the CU suspension of delivery of data traffic to the DU, it is possible for the CU to simply re-initiate forwarding of data traffic to the first DU without any further L2/L1 configuration involved. This may speed up traffic delivery over the first DU and may allow for a fast switch of traffic delivery between different serving DUs.

According to some embodiments of inventive concepts, fast retransmission of undelivered data traffic to the UE via a new radio link may be provided in cases of fading or blocking of a first serving radio link. Such embodiments may allow that the radio link that temporarily failed is not removed but instead data traffic delivery to the DU serving such radio link may be suspended for the time when the link is subject to poor radio quality. Such embodiments may then enable fast switch of user plane data transmission from the broken radio link to a radio link served by a different DU and that enjoys good/better radio quality.

According to some embodiments, resumption of data traffic delivery via the first radio link served by the first DU may be allowed when the quality of such radio link resumes to a sufficiently good level. Namely, instead of tearing down the broken radio link and reestablishing it once the conditions reveal good radio quality, some embodiments may allow for a fast suspension and resumption of data traffic transmission over the failing radio link.

According to some embodiments, a scenario may be considered where only two radio links are involved. Such radio links may be served by different DUs. However, inventive concepts may also apply to scenarios where a UE is connected to multiple radio links (e.g., more than two radio links) served by different DUs. In such multi connectivity scenario, a UE connected to multiple radio links may see data traffic suspended over multiple radio links, while undelivered traffic is retransmitted via multiple other radio links served by different DUs and where data traffic is re-distributed amongst the DUs that serve radio links with good radio quality. When the multiple failed radio links become good again, traffic can be redistributed amongst all DUs as it was before failure events.

A first method according to some embodiments of inventive concepts is described below. It is assumed that a distributed unit (DU1) determines that the radio link between DU1 and UE is temporarily down and that the DU1

(as "master" of that radio interface) should decide when to give up and to resume the data transfer via another path (DU2).

In a distributed Unit (DU) triggered recovery procedure, the serving DU1 monitors the radio link conditions to the UE (e.g., based on measurement reports, CQI feedback, UL measurements (e.g., using sounding reference signals, SRS), HARQ ACK/NACK ratios, RLC status reports, etc.). The DU1 may discover that the radio link to the UE is temporarily unusable. Since NR (New Radio) is a network controlled and centrally scheduled radio interface, the DU1 should take this decision (long) before the UE. For this reason, a UE triggers Radio Link Failure (RLF) only after a fairly long time after detecting radio link problems. In this situation, DU1 indicates to the CU that it can currently not transfer any data to the UE. This may be achieved by letting DU1 send a message to the CU stating that the radio link to the served UE is temporarily unavailable. Note that the indication of temporary unavailability may be different than an indication of general unavailability/outage, and this difference can be indicated as a different flag/cause value/indication in the message from DU1 to CU. A temporary unavailability by DU1 may be determined by radio link conditions or trends of the conditions within certain bounds/thresholds (different than the bounds/threshold used to determine general unavailability/outage).

In particular, a Distributed Unit (DU1) monitors its radio link towards the UE and notifies the CU when it cannot transfer any data to the UE due to a temporary radio link blockage.

It should be observed that the UE's RLF (Radio Link Failure) mechanism should react conservatively (slow) compared to the network-side RRM (Radio Resource Management) mechanism (for signaling temporary outage over the radio link) in order to reduce/avoid state-desynchronization and unnecessary retransmissions.

Information on which PDCP PDUs (Protocol Data Units) may need to be retransmitted by the CU over a new DU2 radio link can be provided by the first DU by means of a number of techniques. One first technique is to deduce unsuccessfully delivered PDCP PDUs on the basis of the received RLC (Radio Link Control) Acknowledgement messages. In this case, all the PDCP (Packet Data Convergence Protocol) PDUs (Protocol Data Units) corresponding to unacknowledged RLC PDUs may be flagged to the CU as PDUs that need to be retransmitted. Another technique may be to rely on RLC Status Reports from the UE. By means of RLC Status Reports, the serving DU knows which RLC PDUs have been successfully transmitted to the UE and it can derive which PDCP PDUs have been transmitted (1:1 mapping between (complete) RLC PDUs and PDCP PDUs in NR).

According to any of the techniques above or indeed, via any suitable alternative technique, when a DU1 determines that the radio link to the UE has become unusable, it may inform the CU of which PDCP PDUs have been delivered and, correspondingly, which ones have likely not yet been delivered and should be re-sent via another path (e.g. DU2).

Additionally, the DU1 may inform the CU about information about RLC SN (Sequence Number) numbers used for the PDCP PDU, as well information on RLC level segmentation, and the number waiting RLC packets in the transmit buffer (e.g. related to not delivered PDCP packets). This additional information may be used at the CU in case it is decided to resume transmission once the link becomes usable. For example, if the number of waiting packets are large it may be desirable to explicitly flush the RLC buffer to speed up resumption of data transmission of new packets.

In some embodiments of inventive concepts, the CU may apply different measures to recover unsuccessfully sent PDCP PDUs via the DU1 indicating unavailability depending on the type of unavailability indicated by the DU1, i.e., temporary unavailability or general outage/unavailability. In case of temporary unavailability, the CU may trigger a light-weight data recovery procedure, i.e. to resend the unsuccessfully transmitted PDCP PDUs via the other DU to the UE. In case of general outage, the CU may trigger a full PDCP data recovery procedure for the UE, flushing RLC data of DU1 and the UE and resetting MAC.

Therefore, when informing the CU that the radio link to the UE is currently unusable, the DU1 informs the CU about which PDCP PDUs have not been delivered successfully and should eventually be re-sent via a different link.

In some embodiments of inventive concepts, temporary unavailability is indicated (interpreted) by indicating a negative amount of wanted more data for transmission in DU1 to the CU, as part of a flow control protocol. The negative amount of data (PDUs) refers then to the PDUs requiring retransmission since not yet successfully transmitted.

Accuracy of the "outstanding data" indication may be improved. The RLC status reports may be exchanged significantly less often than HARQ feedback. This is to keep the overhead reasonably low and to reduce/avoid triggering unnecessary retransmissions. As a consequence, the DU1 may suggest retransmissions of some PDCP PDUs that the UE has actually already received. Since NR will operate with a lower HARQ (Hybrid Automatic Repeat Request) RTT (Round Trip Time) than LTE, the RLC status reports should also be sent more frequently. This may reduce the above mentioned "overhead". To address this issue, the UE may send a PDCP status report to the target DU, i.e. to the DU2 designated to take over delivery of user plane traffic while the first DU1 is not available, immediately after the link with the first DU1 is lost. Such PDCP Status Report may be sent via RRC, e.g. via the RRCConnectionReconfigurationComplete message. The PDCP Status Report states which PDCP PDUs were correctly received by the UE. Such report will be forwarded to the serving CU. The serving CU can therefore understand which of the PDCP PDUs that have been signaled by the first DU for retransmission have been correctly received by the UE. This can avoid unnecessary retransmissions.

The UE will likely have received some packets for which the DU1 has not yet received an acknowledgement. This may lead to unnecessary retransmissions. The impact of those on the end-to-end performance is expected to be small. However, this can be reduced/avoided if the UE sends a status report in the target cell (similar to PDCP Status report in LTE).

Furthermore, the UE may have received an RLC PDU that carried one segment of a PDCP PDU but not the RLC PDU carrying the remainder of that PDCP PDU. If the DU1 reports to the CU on a PDCP PDU basis, the CU may retransmit PDCP payload octets that the UE had actually already received. It should however be noted that at high L1 data rates (large transport blocks) only few PDCP PDUs will be subject to segmentation. Secondly, NR will use lower HARQ RTT than LTE and can hence work with fewer HARQ processes. Therefore, the impact of unnecessary retransmissions of already received segments of PDCP PDUs is expected to be small.

PDUs may be discarded in source DU1. After notifying the CU, the DU1 experiencing problems could discard all pending PDCP PDUs (and optionally the RLC PDUs encapsulating these PDCP PDUs and potentially MAC HARQ processes carrying these PDUs) since the CU will ensure that these packets are anyway delivered via other DUs. It could be considered that the DU keeps the packets for the case that its radio link to the UE becomes available again. However, it should be assumed that the link interruption persists usually at least for a time duration that enables the new DU to transmit that amount of data. In this case DU1 may not need to send stored traffic as this would result in duplicate PDU reception at the UE. If the interruptions of the radio link over DU1 would persist only for a very short time (so that the DU2 has anyway no chance to take over and transmit traffic that already reached DU1), this may be a symptom of the DU1 declaring the failure too aggressively to the CU. In this case a mechanism can be provided for the CU to detect reception of duplicate packets. For example, the CU could inspect the PDCP Status Report sent by the UE and realize that the UE already received PDCP PDUs that the CU delivered to DU2. With this information, the CU could indicate to DU1 that declaration of radio link outage was done too aggressively (too early outage detection) and DU1 can adjust its outage/unavailability detection criteria, e.g. timers, accordingly. It is worth noticing that an equivalent mechanism could be in place for a too late outage detection. This could be achieved by allowing the CU to identify (e.g. via PDCP Status Report) that many PDCP PDUs have not been received by the UE and that DU1 could declare radio link outage faster, so to switch user data transmission via DU2 in a faster way.

It is also possible that data forwarded to DU1 before data traffic forwarding from the CU is moved to DU2 is not flushed but is kept and some of this data is periodically attempted to be sent to the UE. Such periodic attempts may serve the purpose of checking if the radio link of DU1 is correctly functioning again. As an alternative to storing data in DU1, the CU could, after having switched data forwarding to DU2, periodically send some PDCP PDUs to DU1 to let DU1 attempt transmission to the UE. If transmission to the UE is successful, DU1 would be able to trigger signaling with the CU that resumes data transmission via DU1.

In case DU1 decides to discard partially transmitted packets that will be transmitted by the CU using an alternative path, DU1 may need to indicate this to the UE (e.g. using RLC signaling) at the time the link is recovered so that RLC in the receiver discards any partially received packets as well.

Packet duplication may be provided. Signaling from DU1 to CU can also indicate that all traffic is duplicated and sent from CU to both DU1 and DU2. This may increase/maximize chances that PDCP PDUs are received correctly at UE, however it may also imply resource wastage due to unnecessary retransmissions over multiple links. The CU will transmit PDCP PDUs with the SNs indicated in the signaling received from DU1 to the DU2. The CU will from this moment on duplicate PDCP PDUs and send them over both DUs A UE may receive a PDCP PDU once (via one of the DUs) or twice (via both DUs, in case both manage to send it successfully). This should not be a problem as the UE can just discard the duplicate PDU.

In an UL (UpLink) direction, the UE may have some data that is stuck in the radio stack (RLC/MAC/L1) towards DU1. In LTE Dual Connectivity, that data stays there until the MeNB instructs the UE to change the bearer type from "MCG Split" to "MCG" (by RRC signaling). If the interruptions of the radio link are short, it may be undesirable to tear down the leg and change the bearer type.

In this case the CU could send a PDCP control PDU or a DL data PDU in which it tells the UE to "recover data from the DU1 radio stack". The UE would, upon receiving that indication, pull all PDCP PDUs that are stuck in the RLC layer and re-send them via the DU2 link as soon as possible.

Embodiments described above can be described from the point of view of signaling between the CU, the involved DUs and the UE.

As explained above, when receiving appropriate signaling from DU1, the CU forwards the not-yet-delivered PDCP PDUs of the first path towards the DU2. The CU does not need to reconfigure (by RRC) the UE, i.e., it may keep the radio link between the DU1 and the UE configured. Following the LTE DC principles, the UE may discover a failure on that link (S-RLF) and should then stop any uplink transmission. However, since the RRC Connection is still available (via DU2) the UE does not re-establish. Since it does not receive an RRC reconfiguration from the NW (NetWork) it also does not reset the RLC/MAC protocol stack for the DU1 connection. Together with retransmitting traffic that was not successfully sent over the DU1 link, the CU switches forwarding of data traffic originally sent via DU1 to DU2. When the radio link over DU1 regains good enough radio quality for successful data delivery, the CU switches data forwarding of traffic to DU1, as per original configuration of data traffic distribution towards DU1.

Figure 10A:
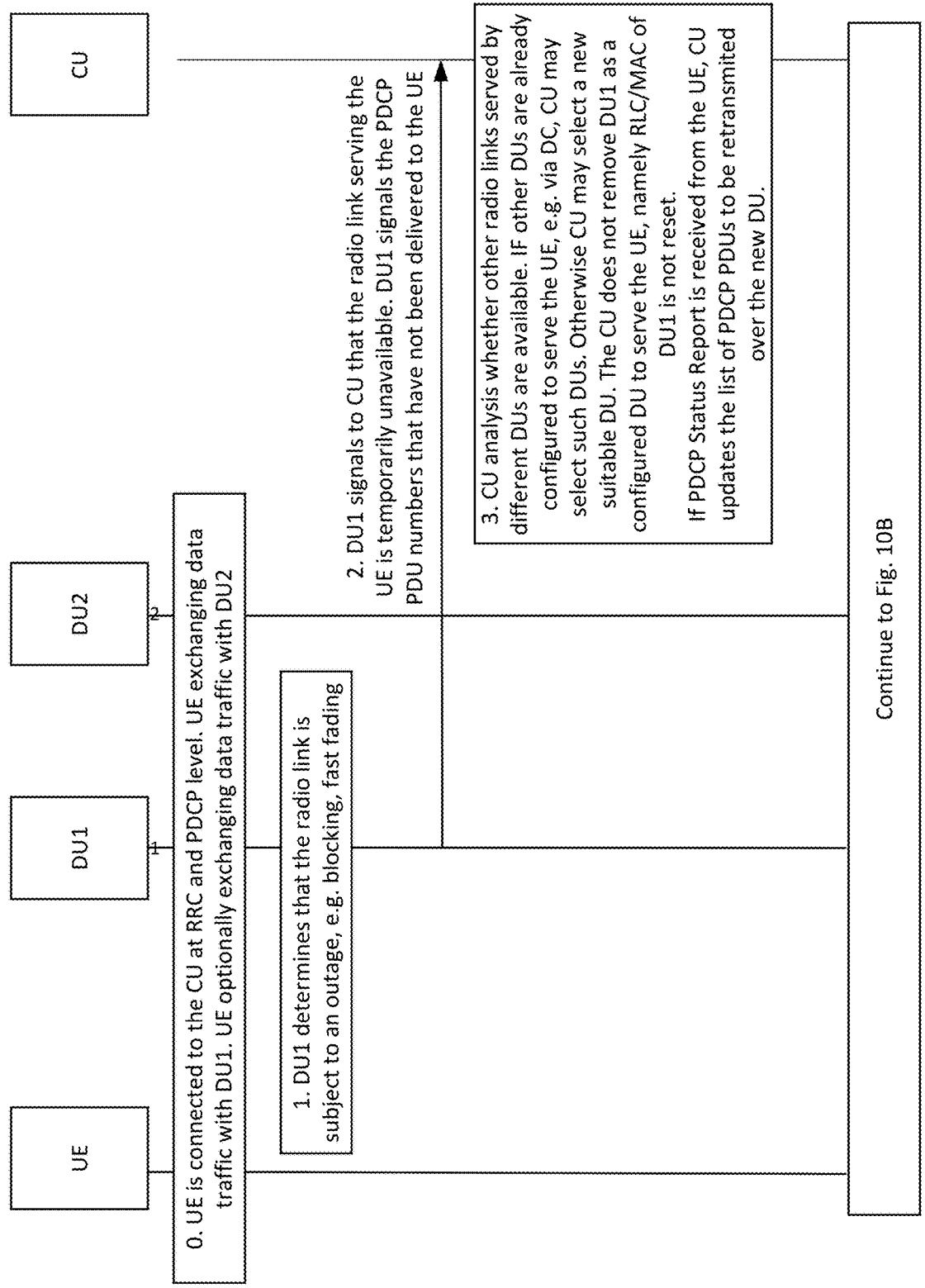

FIGS. 10A-10B show a message sequence chart according to some embodiments of inventive concepts. Initially, mobile communication device UE is connected to the CU node at RRC and PDCP levels at state 0. In FIG. 10A, mobile communication device exchanges data with CU node through first DU node DU1 and optionally through second DU node DU2. At operation 1, first DU node DU1 may determine the radio link with the mobile communication device UE is subject to an outage (e.g., due to blocking, fast fading, etc.) so that the radio link between DU1 and UE may be temporarily unavailable. Responsive to this determination, DU1 may signal to the CU node that the radio link serving UE is temporarily unavailable, and DU1 may signal the PDCP PDU numbers that have not been delivered to the UE at message 2. At operation 3, CU node may analyze whether other radio links served by different DU nodes are available for service with UE. If other DU/DUs are already configured to serve UE (e.g., via DC), CU node may select such DU/DUs. Otherwise, CU node may select a new suitable DU node. The CU node does not remove DU1 as a configured DU node to server UE by not resetting RLC/MAC of DU1. If a PDCP status report is received from UE, CU node updates the list of PDCP PDUs to be retransmitted to UE over the new DU node.

At message 4, CU node signals to the new DU node, DU2, the PDCP PDUs that should be resent due to unsuccessful delivery over DU1. CU node informs DU2 of the new user traffic that DU2 will exchange with UE, and this may be in the form of bearers modification instructions.

At operation 5, data transmissions to UE are maintained via DU2, while DU1 remains configured to serve the UE but no traffic is transmitted by DU1. At operation 6, DU1 and/or CU node may determine that the radio link from DU1 to UE is again available for transmission. This may occur via analysis of UE measurements or via periodic attempts from CU to forward traffic to DU1 and attempts from DU1 to successfully transmit such traffic to UE. At operation 7, CU node resumes traffic delivery to DU1 as per configuration before the radio outage/unavailability, and DU1 forwards traffic to UE over the radio link.

Figure 11:
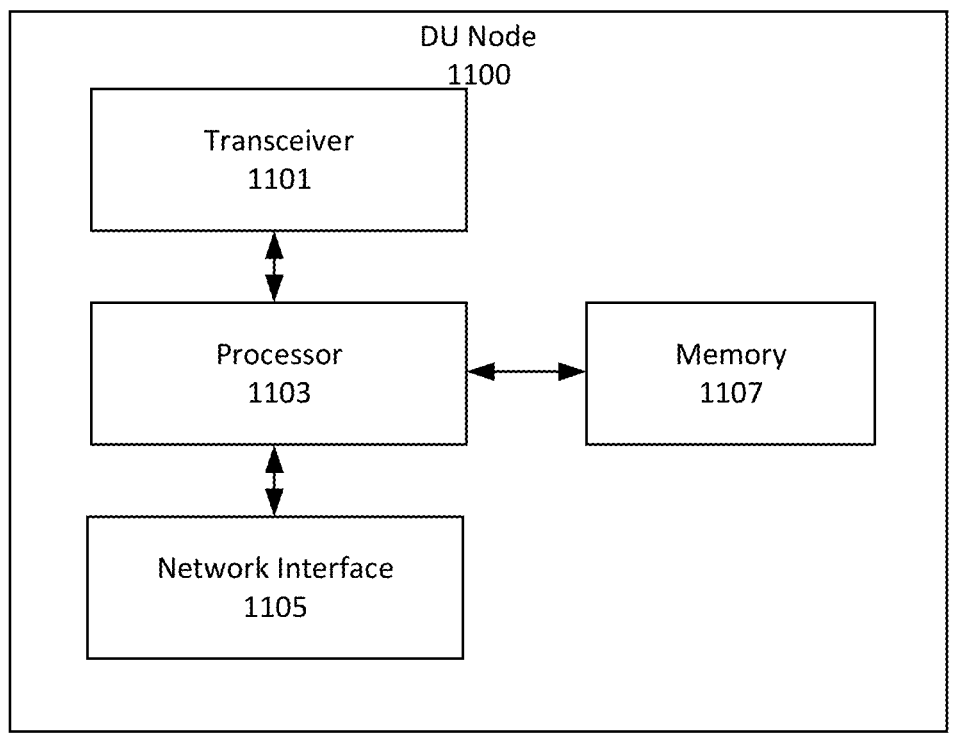
FIG. 11 is a block diagram illustrating a DU node according to some embodiments of inventive concepts.

FIG. 11 is a block diagram illustrating a distributed unit DU node 1100 (e.g., DU node DU1 or DU2) according to some embodiments disclosed herein. As shown, DU node 1100 may include processor 1103 coupled with transceiver 1101, network interface 1105, and memory 1107. Transceiver 1101 may include one or more of a cellular radio access network (RAN) interface (also referred to as a RAN transceiver) and/or other wireless network communication interface. DU node 1100 can thus provide wireless communication over one or more radio links with one or more mobile communication devices. Network interface 1105 may provide communication with other network nodes/devices such as a CU node. Processor 1103 (also referred to as a processor circuit or processing circuitry) may include one or more data processing circuits, such as a general purpose and/or special purpose processor (e.g., microprocessor and/or digital signal processor). Processor 1103 may be configured to execute computer program instructions from functional modules in memory 1107 (also referred to as a memory circuit or memory circuitry), described below as a computer readable medium, to perform some or all of the operations and methods that are described herein for one or more of the embodiments. Moreover, processor 1103 may be defined to include memory so that separate memory 1107 may not be required.

Figure 12:
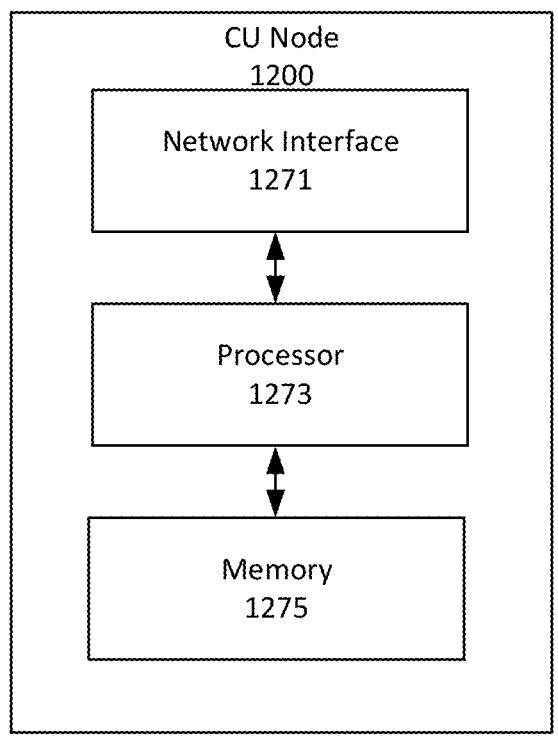
FIG. 12 is a block diagram illustrating a CU node according to some embodiments of inventive concepts.

FIG. 12 is a block diagram illustrating a central unit CU node 1200 according to some embodiments disclosed herein. As shown, CU node 1200 may include processor 1273 coupled with network interface 1271 and memory 1275. Network interface 1271 may provide communication with other network nodes/devices such as a plurality of DU nodes. Processor 1273 (also referred to as a processor circuit or processing circuitry) may include one or more data processing circuits, such as a general purpose and/or special purpose processor (e.g., microprocessor and/or digital signal processor). Processor 1273 may be configured to execute computer program instructions from functional modules in memory 1275 (also referred to as a memory circuit or memory circuitry), described below as a computer readable medium, to perform some or all of the operations and methods that are described herein for one or more of the embodiments. Moreover, processor 1273 may be defined to include memory so that separate memory 1275 may not be required.

Operations of DU node 1100 will now be discussed with reference to the flow chart of FIG. 13 and the modules of FIG. 14 according to some other embodiments of inventive concepts. For example, modules of FIG. 14 may be stored in memory 1107 of FIG. 11, and these modules may provide instructions so that when the instructions of a module are executed by processor 1103, processor 1103 performs respective operations of the flow chart of FIG. 13. Moreover, DU node 1101 may be a node of a gNodeB (gNB) that also includes a central unit CU node with which DU node 1101 communicates and DU nodes.

Figure 13:
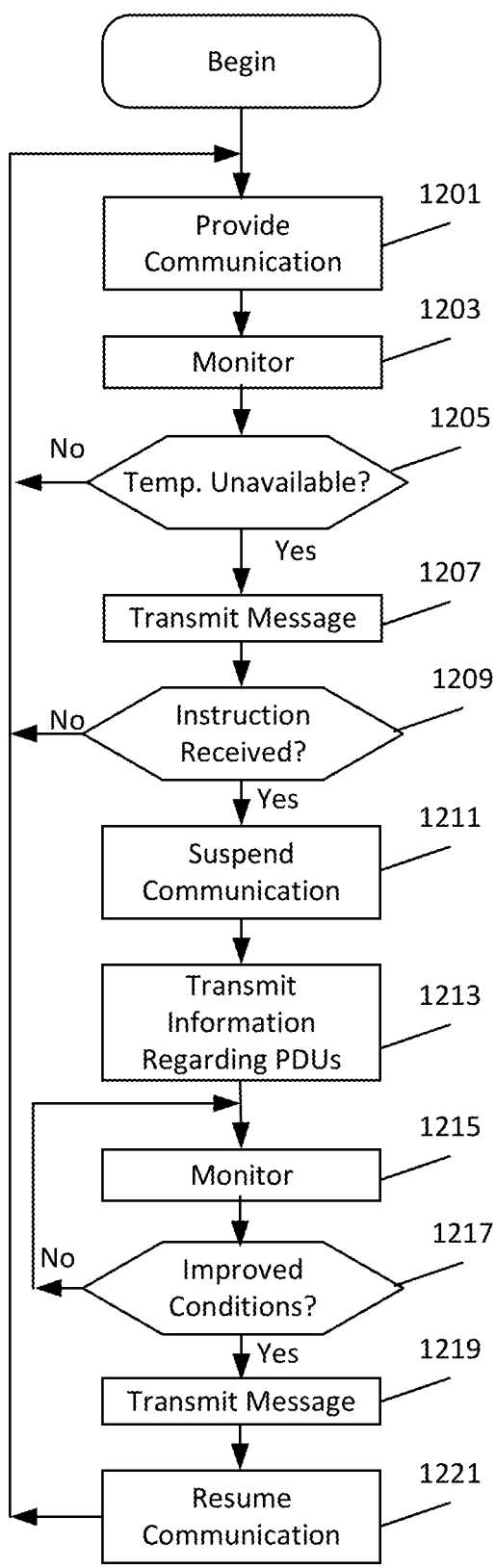
FIG. 13 is a flow chart illustrating DU node operations according to some embodiments of inventive concepts.

Operations of DU node 1100 are illustrated in the flow chart of FIG. 13 according to some embodiments of inventive concepts. At block 1201, processor 1103 of a first distributed unit DU node 1100 may provide communication between the CU node and a mobile communication device UE through the first DU node using a first radio link between the DU node and the mobile communication device, for example using communication module 1301. Such communications may be provided through transceiver 1101 and network interface 1105. At block 1203, processor 1103 may monitor conditions of the first radio link used by the first DU node to provide communication between the CU node and the mobile communication device, for example, using monitoring module 1303. Processor 1103, for example, may monitor the conditions based on at least one of measurement reports received from the mobile communication device, Channel Quality Information (CQI) feedback received from the mobile communication device, UpLink (UL) measurements based on signals received from the mobile communication device, HARQ ACK/NACK ratios, and Radio Link Control (RLC) status reports received from the mobile communication device.

At block 1205, processor 1103 may determine if the radio link is temporarily unavailable based on the monitoring, for example using monitoring module 1303. Processor 1103, for example, may determine that the radio link is temporarily unavailable based on trends of least one of measurement reports received from the mobile communication device, CQI feedback received from the mobile communication device, UL measurements based on signals received from the mobile communication device, HARQ ACK/NACK ratios, and RLC status reports received from the mobile communication device.

Responsive to determining that the radio link is temporarily unavailable based on the monitoring at block 1205, processor 1103 may transmit a message to the CU node to inform the CU node that the radio link is temporarily unavailable at block 1207, for example, using transmission module 1307. The message that the radio link is temporarily unavailable may be a message indicating a request for a negative amount of data to be transmitted by the first DU node to the mobile communication device.

Responsive to instructions received from the CU node after transmitting the message at block 1209, processor 1103 may suspend communication between the CU node and the mobile communication device through the first DU node 1100, for example, using suspension module 1311. During suspension, however, processor 1103 may maintain configuration of the first DU node to serve the mobile communication device using the first radio link while suspending communication between the CU node and the mobile communication device through the first DU node. More particularly, maintaining the configuration of the first DU node to serve the mobile communication device using the first radio link may include maintaining at least one of a Medium Access Control (MAC) configuration, a Radio Link Control (RLC) configuration, a Layer 1 (L1) configuration, and/or a Layer 2 (L2) configuration while suspending communication between the CU node and the mobile communication device through the first DU node.

Responsive to determining that the radio link is temporarily unavailable based on the monitoring at blocks 1203 and 1205, processor 1103 may transmit information through network interface 1105 to the CU node at block 1213 where the information identifies Protocol Data Units (PDUs) that have not been transmitted over the radio link to the mobile communication device and/or identifying PDUs that have been transmitted over the radio link to the mobile communication device. Processor 1103 may perform operations of block 1213 using PDU information transmission module 1313. According to some embodiments, processor 1103 may determine the PDUs that have not been transmitted over the radio link to the mobile communication device based on Acknowledgement messages received from the mobile communication device at the first DU node. According to some other embodiments, processor 1103 may determine the PDUs that have not been transmitted over the radio link to the mobile communication device based on Radio Link Control (RLC) status reports received from the mobile communication device at the first DU node. The information identifying the PDUs may include at least one of Radio Link Control (RLC) Sequence Numbers (SNs), information regarding RLC level segmentation, and/or a number of RLC packets in a transmit buffer of the first DU node. Moreover, the PDUs may be Packet Data Convergence Protocol (PDCP) PDUs.

After transmitting the message at block 1207, processor 1103 may monitor conditions of the first radio link between the first DU node and the mobile communication device while suspending communication between the CU node and the wireless communication device through the first DU node at block 1215, for example, using monitoring module 1315. Responsive to detecting improved conditions over the first radio link at block 1217, processor 1103 may transmit a message to the CU node to inform the CU node that the first radio link is available at block 1219, for example, using transmission module 1319.

After transmitting the message that the first radio link is available at block 1219, processor 1103 may resume providing communication between the CU node and the mobile communication device through the first DU node using the first radio link at block 1221, for example, using communication resumption module 1321. Resuming communication may include processor 1103 transmitting instruction through transceiver 1101 over the first radio link for the mobile communication device to discard any partially received packets.

After transmitting the message that the radio link is temporarily unavailable at block 1207, processor 1103 may receive instruction from the CU node to flush a Radio Link Control (RLC) buffer of the DU node for the mobile communication device. Responsive to receiving this instruction, processor 1103 may flush the RLC buffer for the mobile communication device.

According to some other embodiments, processor 1101 may maintain Packet Data Units (PDUs) in a buffer of the first DU node for the mobile communication device after transmitting the message while suspending communication between the CU node and the mobile communication device through the first DU node. According to such embodiments, monitoring at block 1215 while suspending communication may include transmitting one of the PDUs from the buffer for the mobile communication device and detecting improved conditions over the first radio link responsive to success transmitting the one of the PDUs from the buffer.

According to some embodiments, processor 1101 may discard pending Packet Data Units (PDUs) in a buffer of the first DU node for the mobile communication device responsive to determining that the radio link is temporarily unavailable. Moreover, discarding pending PDUs may include discarding at least one of PDCP PDUs, RLC PDUs, and MAC HARQ processes carrying PDCP PDUs and/or RLC PDUs.

Figure 14:
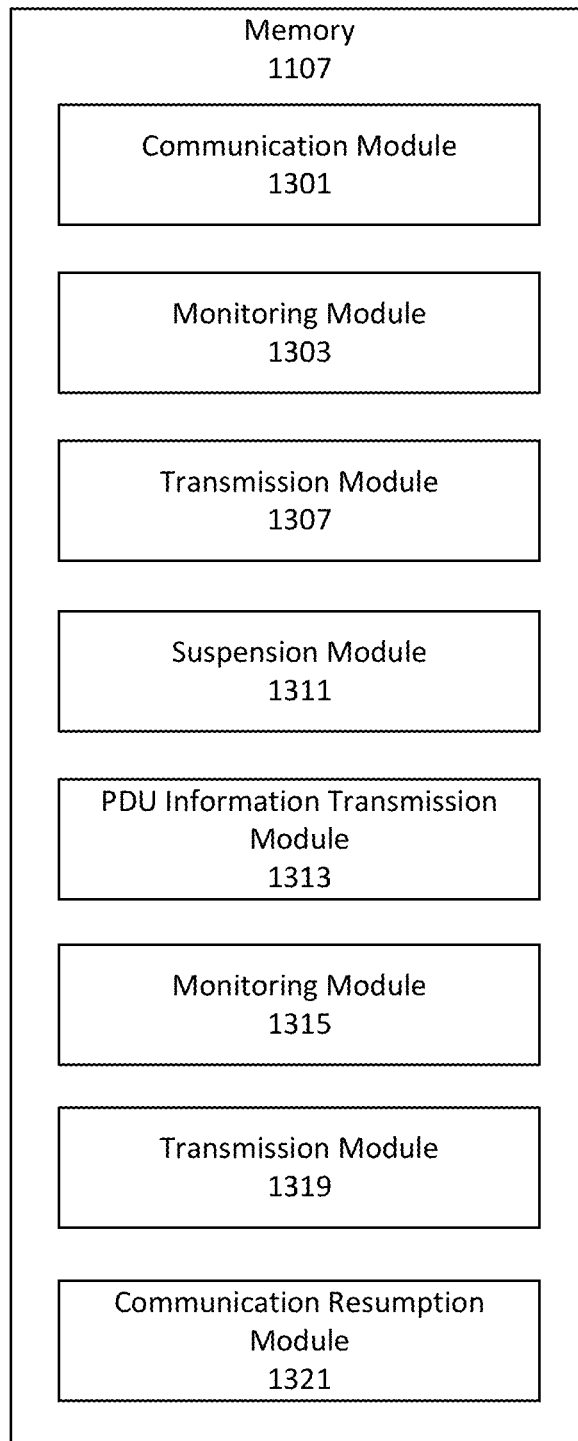
FIG. 14 is a block diagram illustrating DU node modules according to some embodiments of inventive concepts.

Various operations of FIG. 13 and/or modules of FIG. 14 may be optional with respect to some embodiments. Regarding methods of example embodiment 1 (set forth below), for example, operations of blocks 1213, 1215, 1217, 1219, and 1221 of FIG. 13 may be optional, and regarding related CU nodes, modules 1313, 1315, 1319, and 1321 of FIG. 14 may be optional.

Operations of CU node 1200 will now be discussed with reference to the flow chart of FIG. 15 and the modules of FIG. 16 according to some other embodiments of inventive concepts. For example, modules of FIG. 16 may be stored in memory 1275 of FIG. 12, and these modules may provide instructions so that when the instructions of a module are executed by processor 1273, processor 1273 performs respective operations of the flow chart of FIG. 15.

Figure 15:
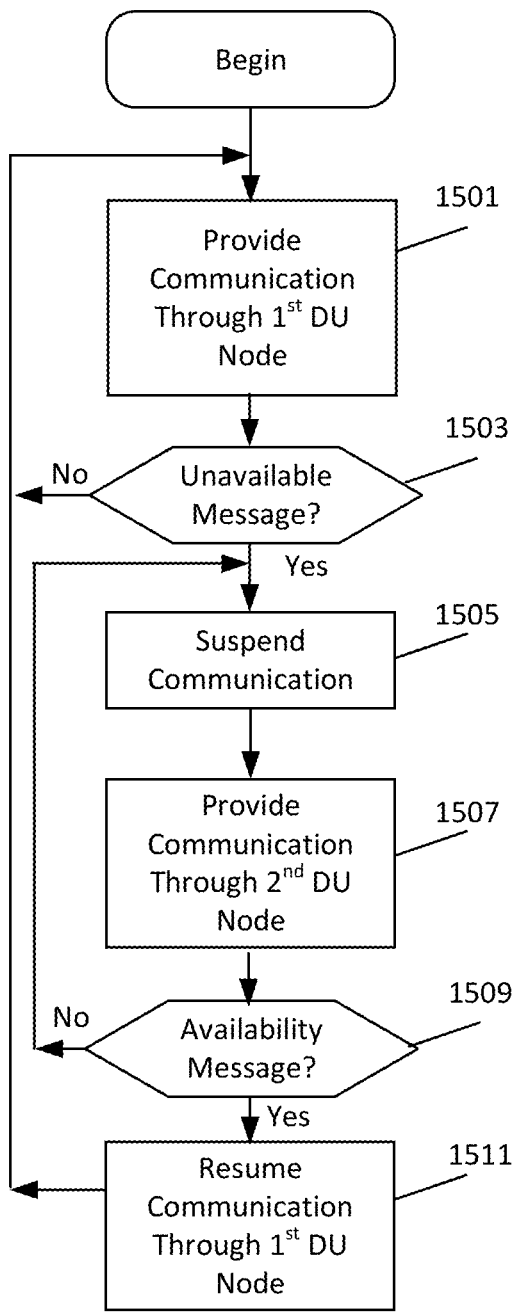
FIG. 15 is a flow chart illustrating CU node operations according to some embodiments of inventive concepts.

Operations of CU node 1200 are illustrated in the flow chart of FIG. 15 according to some embodiments of inventive concepts. As discussed above, CU mode processor 1273 may provide communication between the CU node and a mobile communication device UE through the first DU node DU1 over a first radio link between the first DU node and the mobile communication device at block 1501, for example, using communication module 1601. At block 1503, processor 1273 may receive an unavailability message through network interface 1271 from the first DU node DU1 to inform the CU node that the radio link is temporarily unavailable at block 1503, for example, using unavailability message module 1603. The message that the radio link is temporarily unavailable may include a message indicating a request for a negative amount of data to be transmitted by the first DU node to the mobile communication device. According to some other embodiments, the message from the first DU node DU1 may be received as a Radio Resource Management (RMM) message.

Responsive to receiving the unavailability message that the first radio link is temporarily unavailable at block 1503, processor 1273 may suspend communication between the CU node and the mobile communication device through the first DU node at block 1505, for example, using suspension module 1605. Moreover, configuration of the first DU node to serve the mobile communication device using the first radio link is maintained while suspending communication between the CU node and the mobile communication device through the first DU node.

While suspending communication between the CU node and the mobile communication device through the first DU node DU1, processor 1273 may provide communication between the CU node and the mobile communication device through the second DU node DU2 over a second radio link between the second DU node and the mobile communication device at block 1507, for example, using communication module 1607. Maintaining the configuration of the first DU node DU1 to serve the mobile communication device using the first radio link may include maintaining at least one of a Medium Access Control (MAC) configuration, a Radio Link Control (RLC) configuration, a Layer 1 (L1) configuration, and/or a Layer 2 (L2) configuration while suspending communication between the CU node and the mobile communication device through the first DU node.

According to some embodiments, providing communication at block 1507 may include identifying Packet Data Units (PDUs) previously provided to the first DU node and not delivered to the mobile communication device. Moreover, processor 1273 may instruct the second DU node DU2 to transmit the previously provided PDUs to the mobile communication device over the second radio link between the second DU node DU2 and the mobile communication device. Identifying the PDUs previously provided to the first DU node and not delivered may include receiving information from the first DU node DU1 regarding the previously provided PDUs that have not been delivered to the mobile communication device.

According to some embodiments, providing communication at block 1507 may include receiving a Status Report from the mobile communication device through the second DU node DU2, wherein the Status Report identifies Packet Data Units (PDUs) that have been successfully received by the mobile communication device. Responsive to the status report, processor 1273 may identify PDUs previously provided to the first DU node that should be retransmitted to the mobile communication device through the second DU node. Responsive to identifying the PDUs that should be retransmitted, processor 1272 may retransmit the PDUs through the network interface 1271 and second DU node DU2 over the second radio link to the mobile communication device.

According to some embodiments, suspending communication at block 1505 may include processor 1273 determining a number of Packet Data Units (PDUs) not received by the mobile communication device. Responsive to the number of PDUs not received, processor 1273 may instruct the first DU node DU1 to modify a criteria used to determine that a radio link is temporarily unavailable. For example, processor 1273 may instruct the first DU node DU1 to increase a threshold criteria used to determine that a radio link is temporarily unavailable responsive to the number of PDUs not received being less than a threshold. In an alternative, processor 1273 may instruct the first DU node DU1 to decrease a threshold criteria used to determine that a radio link is temporarily unavailable responsive to the number of PDUs not received being greater than a threshold.

At bock 1509, processor 1273 may receive a message from the first DU node to inform the CU node that the radio link is available, for example, using availability message module 1609. Based on the message at block 1509, processor may determine that the first radio link is available, and responsive to determining that the first radio link between the first DU node and the mobile communication device is available, processor 1273 may resume communication between the CU node and the mobile communication device through the first DU node over the first radio link at block 1511, for example, using communication resumption module 1621.

Figure 16:
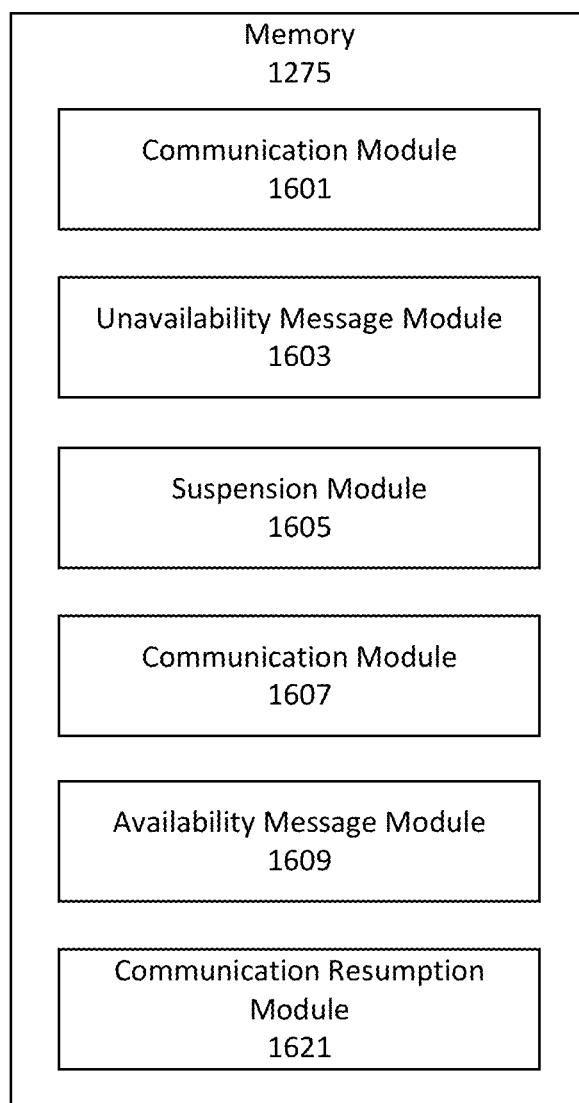
FIG. 16 is a block diagram illustrating CU node modules according to some embodiments of inventive concepts.

Various operations of FIG. 15 and/or modules of FIG. 16 may be optional with respect to some embodiments. Regarding methods of example embodiment 24 (set forth below), for example, operations of blocks 1509 and 1511 of FIG. 15 may be optional, and regarding related CU nodes, modules 1609 and 1621 of FIG. 16 may be optional.

Example embodiments are discussed below.

Embodiment 1

A method of operating a first distributed unit, DU, node (1100), wherein a central unit (CU) node is coupled with the first DU node and a second distributed unit, DU, node, the method comprising: providing communication between the CU node and a mobile communication device, UE, through the first DU node using a first radio link between the DU node and the mobile communication device; monitoring conditions of the first radio link used by the first DU node to provide communication between the CU node and the mobile communication device; responsive to determining that the radio link is temporarily unavailable based on the monitoring, transmitting a message to the CU node to inform the CU node that the radio link is temporarily unavailable; and responsive to instructions received from the CU node after transmitting the message, suspending communication between the CU node and the mobile communication device through the first DU node, wherein configuration of the first DU node to serve the mobile communication device using the first radio link is maintained while suspending communication between the CU node and the mobile communication device through the first DU node.

Embodiment 2

The method of Embodiment 1 wherein maintaining the configuration of the first DU node to serve the mobile communication device using the first radio link comprises maintaining at least one of a Medium Access Control, MAC, configuration, a Radio Link Control, RLC, configuration, a Layer 1, L1, configuration, and/or a Layer 2, L2, configuration while suspending communication between the CU node and the mobile communication device through the first DU node.

Embodiment 3

The method of any of Embodiments 1-2 further comprising: responsive to determining that the radio link is temporarily unavailable based on the monitoring, transmitting information to the CU node identifying Protocol Data Units (PDUs) that have not been transmitted over the radio link to the mobile communication device and/or identifying PDUs that have been transmitted over the radio link to the mobile communication device.

Embodiment 4

The method of Embodiment 3 further comprising: determining the PDUs that have not been transmitted over the radio link to the mobile communication device based on Acknowledgement messages received from the mobile communication device at the first DU node, wherein transmitting comprises transmitting information identifying the PDUs that have not been transmitted over the radio link.

Embodiment 5

The method of Embodiment 3 further comprising: determining the PDUs that have not been transmitted over the radio link to the mobile communication device based on Radio Link Control, RLC, status reports received from the mobile communication device at the first DU node, wherein transmitting comprises transmitting information identifying the PDUs that have not been transmitted over the radio link.

Embodiment 6

The method of any of Embodiments 3-5 wherein the information identifying the PDUs comprises at least one of Radio Link Control, RLC, Sequence Numbers (SNs), information regarding RLC level segmentation, and/or a number of RLC packets in a transmit buffer of the first DU node.

Embodiment 7

The method of any of Embodiments 3-5, wherein the PDUs are Packet Data Convergence Protocol, PDCP, PDUs.

Embodiment 8

The method of any of Embodiments 1-7 further comprising: after transmitting the message that the radio link is temporarily unavailable, receiving instruction from the CU node to flush a Radio Link Control, RLC, buffer for the mobile communication device; and responsive to receiving the instruction, flushing the RLC buffer for the mobile communication device.

Embodiment 9

The method of any of Embodiments 1-8 wherein the message that the radio link is temporarily unavailable comprises a message indicating a request for a negative amount of data to be transmitted by the first DU node to the mobile communication device.

Embodiment 10

The method of any of Embodiments 1-9 further comprising: after transmitting the message, monitoring conditions of the first radio link between the first DU node and the mobile communication device while suspending communication between the CU node and the wireless communication device through the first DU node; and responsive to detecting improved conditions over the first radio link, transmitting a message to the CU node to inform the CU node that the first radio link is available.

Embodiment 11

The method of Embodiment 10 further comprising: maintaining Packet Data Units, PDUs, in a buffer of the first DU node for the mobile communication device after transmitting the message while suspending communication between the CU node and the mobile communication device through the first DU node, wherein monitoring while suspending communication comprises transmitting one of the PDUs from the buffer for the mobile communication device and detecting improved conditions over the first radio link responsive to success transmitting the one of the PDUs from the buffer.

Embodiment 12

The method of any of Embodiments 10-11 further comprising: after transmitting the message that the first radio link is available, resume providing communication between the CU node and the mobile communication device through the first DU node using the first radio link.

Embodiment 13

The method of Embodiment 12 further comprising: after transmitting the message that the first radio link is available, transmitting instruction over the first radio link for the mobile communication device to discard any partially received packets.

Embodiment 14

The method of any of Embodiments 1-10 further comprising: responsive to determining that the radio link is temporarily unavailable, discarding pending Packet Data Units, PDUs, in a buffer of the first DU node for the mobile communication device.

Embodiment 15

The method of Embodiment 14 wherein discarding pending PDUs comprises discarding at least one of PDCP PDUs, RLC PDUs, and MAC HARQ processes carrying PDCP PDUs and/or RLC PDUs.

Embodiment 16

The method of any of Embodiments 1-15 wherein the CU node and the first DU node are nodes of a gNodeB, gNB.

Embodiment 17

The method of Embodiment 16 wherein the second DU node is a node of the gNodeB.

Embodiment 18

The method of any of Embodiments 1-17 wherein monitoring the conditions of the radio link comprises monitoring the conditions based on at least one of measurement reports received from the mobile communication device, Channel Quality Information, CQI, feedback received from the mobile communication device, UpLink, UL, measurements based on signals received from the mobile communication device, HARQ ACK/NACK ratios, and Radio Link Control, RLC, status reports received from the mobile communication device.

Embodiment 19

The method of any of Embodiments 1-18 wherein determining that the radio link is temporarily unavailable comprises determining that the radio link is temporarily unavailable based on trends of least one of measurement reports received from the mobile communication device, Channel Quality Information, CQI, feedback received from the mobile communication device, UpLink, UL, measurements based on signals received from the mobile communication device, HARQ ACK/NACK ratios, and Radio Link Control, RLC, status reports received from the mobile communication device.

Embodiment 20

The method of any of Embodiments 1-19 wherein transmitting the message to the CU node comprises transmitting the message as a Radio Resource Management, RMM, message.

Embodiment 21

The method of any of Embodiments 1-20 further comprising: modifying a criteria used to determine that a radio link is temporarily unavailable responsive to instructions from the CU node.

Embodiment 22

A first distributed unit, DU, node (1100) of a radio access network, the first DU node comprising: a network interface (1105) configured to provide communications over a network; a transceiver (1101) configured to provide wireless communication over a radio interface; and a processor (1103) coupled with the network interface and the transceiver, wherein the processor is configured to provide communication with a central unit, CU, node through the network interface, wherein the processor is configured to provide communication with a mobile communication device through the transceiver, and wherein the processor is configured to perform operations according to any of Embodiments 1-21.

Embodiment 23

A first distributed unit, DU, node (1100), wherein the first DU node is adapted to perform according to any of embodiments 1-21.

Embodiment 24

A method of operating a central unit, CU, node (1200) that is coupled with first and second distributed unit, DU, nodes, the method comprising: providing communication between the CU node and a mobile communication device, UE, through the first DU node over a first radio link between the first DU node and the mobile communication device; receiving a message at the CU node from the first DU node to inform the CU node that the radio link is temporarily unavailable; and responsive to receiving the message that the first radio link is temporarily unavailable, suspending communication between the CU node and the mobile communication device through the first DU node, wherein configuration of the first DU node to serve the mobile communication device using the first radio link is maintained while suspending communication between the CU node and the mobile communication device through the first DU node; and while suspending communication between the CU node and the mobile communication device through the first DU node, providing communication between the CU node and the mobile communication device through the second DU node over a second radio link between the second DU node and the mobile communication device.

Embodiment 25

The method of Embodiment 24 wherein maintaining the configuration of the first DU node to serve the mobile communication device using the first radio link comprises maintaining at least one of a Medium Access Control, MAC, configuration, a Radio Link Control, RLC, configuration, a Layer 1, L1, configuration, and/or a Layer 2, L2, configuration while suspending communication between the CU node and the mobile communication device through the first DU node.

Embodiment 26

The method of any of Embodiments 24-25 further comprising: responsive to receiving the message, identifying Packet Data Units (PDUs) previously provided to the first DU node and not delivered to the mobile communication device; and responsive to receiving the message, instructing the second DU node to transmit the previously provided PDUs to the mobile communication device over a second radio link between the second DU node and the mobile communication device.

Embodiment 27

The method of Embodiment 26 wherein identifying the PDUs previously provided to the first DU node and not delivered comprises receiving information from the first DU node regarding the previously provided PDUs that have not been delivered to the mobile communication device.

Embodiment 28

The method of any of Embodiments 24-27 wherein the message that the radio link is temporarily unavailable comprises a message indicating a request for a negative amount of data to be transmitted by the first DU node to the mobile communication device.

Embodiment 29

The method of any of Embodiments 24-25 further comprising: receiving a Status Report from the mobile communication device through the second DU node, wherein the Status Report identifies Packet Data Units, PDUs, that have been successfully received by the mobile communication device; responsive to the status report, identifying PDUs previously provided to the first DU node that should be retransmitted to the mobile communication device through the second DU node; and responsive to identifying the PDUs that should be retransmitted, retransmitting the PDUs through the second DU node over the second radio link to the mobile communication device.

Embodiment 30

The method of any of Embodiments 24-29 further comprising: responsive to receiving the message, determining a number of Packet Data Units, PDUs, not received by the mobile communication device; and responsive to the number of PDUs not received, instructing the first DU node to modify a criteria used to determine that a radio link is temporarily unavailable.

Embodiment 31

The method of Embodiment 30 wherein instructing comprises instructing the first DU to increase a threshold criteria used to determine that a radio link is temporarily unavailable responsive to the number of PDUs not received being less than a threshold.

Embodiment 32

The method of Embodiment 30 wherein instructing comprises instructing the first DU to decrease a threshold criteria used to determine that a radio link is temporarily unavailable responsive to the number of PDUs not received being greater than a threshold.

Embodiment 33

The method of any of Embodiments 24-32 wherein the CU node and the first DU node are nodes of a gNodeB, gNB.

Embodiment 34

The method of Embodiment 33 wherein the second DU node is a node of the gNodeB.

Embodiment 35

The method of any of Embodiments 24-34 wherein receiving the message from the first DU node comprises receiving the message as a Radio Resource Management, RMM, message.

Embodiment 36

The method of any of Embodiments 24-35 further comprising: responsive to determining that the first radio link between the first DU node and the mobile communication device is available after suspending communication through the first DU node, resuming communication between the CU node and the mobile communication device through the first DU node over the first radio link.

Embodiment 37

The method of Embodiment 36 further comprising: receiving a message at the CU node from the first DU node to inform the CU node that the radio link is available, wherein determining that the first radio link is available comprising determining that the first radio link is available responsive to the message that the radio link is available.

Embodiment 38

A central unit, CU, node (1200) of a radio access network, the CU node comprising: a network interface (1271) configured to provide communications over a network; and a processor (1273) coupled with the network interface, wherein the processor is configured to provide communication with first and second distributed unit, DU, nodes through the network interface, and wherein the processor is configured to perform operations according to any of Embodiments 24-37.

Embodiment 39

A central unit, CU, node (1200), wherein the CU node is adapted to perform according to any of embodiments 24-37.

Embodiment 40

A first distributed unit, DU, node (1100) of a radio access network, wherein a central unit (CU) node is coupled with the first DU node and a second distributed unit, DU, node, the first DU node comprising: a network interface (1105) configured to provide communications over a network; a transceiver (1101) configured to provide wireless communication over a radio interface; and a processor (1103) coupled with the network interface and the transceiver, wherein the processor is configured to provide communication with a central unit, CU, node through the network interface, wherein the processor is configured to provide communication with a mobile communication device through the transceiver, and wherein the processor is configured to, provide communication between the CU node and a mobile communication device, UE, through the first DU node using a first radio link between the DU node and the mobile communication device, monitor conditions of the first radio link used by the first DU node to provide communication between the CU node and the mobile communication device, transmit a message to the CU node to inform the CU node that the radio link is temporarily unavailable responsive to determining that the radio link is temporarily unavailable based on the monitoring, and suspend communication between the CU node and the mobile communication device through the first DU node responsive to instructions received from the CU node after transmitting the message, wherein configuration of the first DU node to serve the mobile communication device using the first radio link is maintained while suspending communication between the CU node and the mobile communication device through the first DU node.

Embodiment 41

A first distributed unit, DU, node (1100), wherein a central unit (CU) node is coupled with the first DU node and a second distributed unit, DU, wherein the first DU node is adapted to: provide communication between the CU node and a mobile communication device, UE, through the first DU node using a first radio link between the DU node and the mobile communication device; monitor conditions of the first radio link used by the first DU node to provide communication between the CU node and the mobile communication device; transmit a message to the CU node to inform the CU node that the radio link is temporarily unavailable responsive to determining that the radio link is temporarily unavailable based on the monitoring; and suspend communication between the CU node and the mobile communication device through the first DU node responsive to instructions received from the CU node after transmitting the message, wherein configuration of the first DU node to serve the mobile communication device using the first radio link is maintained while suspending communication between the CU node and the mobile communication device through the first DU node.

Embodiment 42

A first distributed unit, DU, node (1100), wherein a central unit, CU, node is coupled with the first DU node and a second distributed unit, DU, node, the first DU node comprising: provide communication between the CU node and a mobile communication device, UE, through the first DU node using a first radio link between the DU node and the mobile communication device; monitor conditions of the first radio link used by the first DU node to provide communication between the CU node and the mobile communication device; transmit a message to the CU node to inform the CU node that the radio link is temporarily unavailable responsive to determining that the radio link is temporarily unavailable based on the monitoring; and suspend communication between the CU node and the mobile communication device through the first DU node responsive to instructions received from the CU node after transmitting the message, wherein configuration of the first DU node to serve the mobile communication device using the first radio link is maintained while suspending communication between the CU node and the mobile communication device through the first DU node.

Embodiment 43

A central unit, CU, node (1200) of a radio access network, wherein the CU node is coupled with first and second distributed unit, DU, nodes, the CU node comprising: a network interface (1271) configured to provide communications over a network; and a processor (1273) coupled with the network interface, wherein the processor is configured to provide communication with the first and second DU nodes through the network interface, and wherein the processor is configured to, provide communication between the CU node and a mobile communication device, UE, through the first DU node over a first radio link between the first DU node and the mobile communication device, receive a message at the CU node from the first DU node to inform the CU node that the radio link is temporarily unavailable, suspend communication between the CU node and the mobile communication device through the first DU node responsive to receiving the message that the first radio link is temporarily unavailable, wherein configuration of the first DU node to serve the mobile communication device using the first radio link is maintained while suspending communication between the CU node and the mobile communication device through the first DU node, and provide communication between the CU node and the mobile communication device through the second DU node over a second radio link between the second DU node and the mobile communication device while suspending communication between the CU node and the mobile communication device through the first DU node.

Embodiment 44

A central unit, CU, node (1200) that is coupled with first and second distributed unit, DU, nodes, wherein the CU node is adapted to: provide communication between the CU node and a mobile communication device, UE, through the first DU node over a first radio link between the first DU node and the mobile communication device; receive a message at the CU node from the first DU node to inform the CU node that the radio link is temporarily unavailable; and suspend communication between the CU node and the mobile communication device through the first DU node responsive to receiving the message that the first radio link is temporarily unavailable, wherein configuration of the first DU node to serve the mobile communication device using the first radio link is maintained while suspending communication between the CU node and the mobile communication device through the first DU node; and provide communication between the CU node and the mobile communication device through the second DU node over a second radio link between the second DU node and the mobile communication device while suspending communication between the CU node and the mobile communication device through the first DU node.

Embodiment 45

A central unit, CU, node that is coupled with first and second distributed unit, DU, nodes, the CU node comprising: a first communication module configured to provide communication between the CU node and a mobile communication device, UE, through the first DU node over a first radio link between the first DU node and the mobile communication device; an unavailability message module configured to receive a message at the CU node from the first DU node to inform the CU node that the radio link is temporarily unavailable; a suspension module configured to suspend communication between the CU node and the mobile communication device through the first DU node responsive to receiving the message that the first radio link is temporarily unavailable, wherein configuration of the first DU node to serve the mobile communication device using the first radio link is maintained while suspending communication between the CU node and the mobile communication device through the first DU node; and a second communication module configured to provide communication between the CU node and the mobile communication device through the second DU node over a second radio link between the second DU node and the mobile communication device while suspending communication between the CU node and the mobile communication device through the first DU node.

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a central unit, CU, node that is coupled with a first distributed unit, DU, node and a second DU node, the method comprising:
providing communication between the CU node and a mobile communication device through the first DU node over a first radio link between the first DU node and the mobile communication device;
receiving a message at the CU node from the first DU node to inform the CU node that the first radio link is temporarily unavailable;
responsive to receiving the message that the first radio link is temporarily unavailable, suspending communication between the CU node and the mobile communication device through the first DU node, wherein configuration of the first DU node to serve the mobile communication device using the first radio link is maintained while suspending communication between the CU node and the mobile communication device through the first DU node;
while suspending communication between the CU node and the mobile communication device through the first DU node, providing communication between the CU node and the mobile communication device through the second DU node over a second radio link between the second DU node and the mobile communication device; and
responsive to determining that the first radio link between the first DU node and the mobile communication device is available after suspending communication through the first DU node, resuming communication between the CU node and the mobile communication device through the first DU node over the first radio link using the configuration of the first DU node maintained while suspending the communication between the CU node and the mobile communication device through the first DU node.

2. The method of claim 1 wherein maintaining the configuration of the first DU node to serve the mobile communication device using the first radio link comprises maintaining at least one of a Medium Access Control, MAC, configuration, a Radio Link Control, RLC, configuration, a Layer 1, L1, configuration, and/or a Layer 2, L2, configuration while suspending communication between the CU node and the mobile communication device through the first DU node.

3. The method of claim 1 further comprising:
responsive to receiving the message, identifying Packet Data Units, PDUs, previously provided to the first DU node and not delivered to the mobile communication device; and
responsive to receiving the message, instructing the second DU node to transmit the previously provided PDUs to the mobile communication device over the second radio link between the second DU node and the mobile communication device.

4. The method of claim 1 further comprising:
receiving a Status Report from the mobile communication device through the second DU node, wherein the Status Report identifies Packet Data Units, PDUs, that have been successfully received by the mobile communication device;
responsive to the status report, identifying PDUs previously provided to the first DU node that should be retransmitted to the mobile communication device through the second DU node; and
responsive to identifying the PDUs that should be retransmitted, retransmitting the PDUs through the second DU node over the second radio link to the mobile communication device.

5. The method of claim 1 further comprising:
responsive to receiving the message, determining a number of Packet Data Units, PDUs, not received by the mobile communication device; and
responsive to the number of PDUs not received, instructing the first DU node to modify a criteria used to determine that a radio link is temporarily unavailable.

6. The method of claim 1 further comprising:
receiving a message at the CU node from the first DU node to inform the CU node that the first radio link is available, wherein determining that the first radio link is available comprises determining that the first radio link is available responsive to the message that the first radio link is available.

7. A method of operating a first distributed unit, DU, node, wherein a central unit, CU, node is coupled with the first DU node and a second distributed unit, DU, node, the method comprising:
providing communication between the CU node and a mobile communication device through the first DU node using a first radio link between the DU node and the mobile communication device;

monitoring conditions of the first radio link used by the first DU node to provide communication between the CU node and the mobile communication device;

responsive to determining that the first radio link is temporarily unavailable based on the monitoring, transmitting a message to the CU node to inform the CU node that the first radio link is temporarily unavailable;

responsive to instructions received from the CU node after transmitting the message, suspending communication between the CU node and the mobile communication device through the first DU node, wherein configuration of the first DU node to serve the mobile communication device using the first radio link is maintained while suspending communication between the CU node and the mobile communication device through the first DU node;

after transmitting the message, monitoring conditions of the first radio link between the first DU node and the mobile communication device while suspending communication between the CU node and the mobile communication device through the first DU node;

responsive to detecting improved conditions over the first radio link, transmitting a message to the CU node to inform the CU node that the first radio link is available; and after transmitting the message that the first radio link is available, resume providing communication between the CU node and the mobile communication device through the first DU node using the first radio link and using the configuration of the first DU node maintained while suspending the communication between the CU node and the mobile communication device through the first DU node.

8. The method of claim 7 further comprising:
responsive to determining that the first radio link is temporarily unavailable based on the monitoring, transmitting information to the CU node identifying Protocol Data Units, PDUs, that have not been transmitted over the first radio link to the mobile communication device and/or identifying PDUs that have been transmitted over the first radio link to the mobile communication device.

9. The method of claim 7 further comprising:
after transmitting the message that the first radio link is temporarily unavailable, receiving instruction from the CU node to flush a Radio Link Control, RLC, buffer for the mobile communication device; and
responsive to receiving the instruction, flushing the RLC buffer for the mobile communication device.

10. A central unit, CU, node of a radio access network, the CU node comprising:
a network interface configured to provide communications over a network with a first distributed node, DU, and second distributed unit, DU, node; and
a processor coupled with the network interface, wherein the processor is configured to provide communication with first and second distributed unit, DU, nodes through the network interface, and wherein the processor is further configured to,
provide communication between the CU node and a mobile communication device through the first DU node over a first radio link between the first DU node and the mobile communication device,
receive a message at the CU node from the first DU node to inform the CU node that the first radio link is temporarily unavailable,
responsive to receiving the message that the first radio link is temporarily unavailable, suspend communication between the CU node and the mobile communication device through the first DU node, wherein configuration of the first DU node to serve the mobile communication device using the first radio link is maintained while suspending communication between the CU node and the mobile communication device through the first DU node;
while suspending communication between the CU node and the mobile communication device through the first DU node, provide communication between the CU node and the mobile communication device through the second DU node over a second radio link between the second DU node and the mobile communication device; and
responsive to determining that the first radio link between the first DU node and the mobile communication device is available after suspending communication through the first DU node, resume communication between the CU node and the mobile communication device through the first DU node over the first radio link using the configuration of the first DU node maintained while suspending the communication between the CU node and the mobile communication device through the first DU node.

11. The central unit, CU, node of claim 10 wherein maintaining the configuration of the first DU node to serve the mobile communication device using the first radio link comprises maintaining at least one of a Medium Access Control, MAC, configuration, a Radio Link Control, RLC, configuration, a Layer 1, L1, configuration, and/or a Layer 2, L2, configuration while suspending communication between the CU node and the mobile communication device through the first DU node.

12. The central unit, CU, node of claim 10, wherein the processor is further configured to:
responsive to receiving the message, identify Packet Data Units, PDUs, previously provided to the first DU node and not delivered to the mobile communication device, and
responsive to receiving the message, instruct the second DU node to transmit the previously provided PDUs to the mobile communication device over a second radio link between the second DU node and the mobile communication device.

13. The central unit, CU, node of claim 10, wherein the processor is further configured to:
receive a Status Report from the mobile communication device through the second DU node, wherein the Status Report identifies Packet Data Units, PDUs, that have been successfully received by the mobile communication device,
responsive to the status report, identify PDUs previously provided to the first DU node that should be retransmitted to the mobile communication device through the second DU node, and
responsive to identifying the PDUs that should be retransmitted, retransmit the PDUs through the second DU node over the second radio link to the mobile communication device.

14. The central unit, CU, node of claim 10, wherein the processor is further configured to:

responsive to receiving the message, determine a number of Packet Data Units, PDUs, not received by the mobile communication device, and responsive to the number of PDUs not received, instruct the first DU node to modify a criteria used to determine that a radio link is temporarily unavailable.

15. The central unit, CU, node of claim 10, wherein the processor is further configured to:

receive a message at the CU node from the first DU node to inform the CU node that the first radio link is available, wherein determining that the first radio link is available comprising determining that the first radio link is available responsive to the message that the first radio link is available.

16. A first distributed unit, DU, node of a radio access network, the first DU node comprising:

a network interface configured to provide communications over a network with a central unit, CU, node;

a transceiver configured to provide wireless communication over a radio interface; and a processor coupled with the network interface and the transceiver, wherein the processor is configured to provide communication with a central unit, CU, node through the network interface, wherein the processor is configured to provide communication with a mobile communication device through the transceiver, and wherein the processor is further configured to:

provide communication between the CU node and a mobile communication device through the first DU node using a first radio link between the DU node and the mobile communication device, monitor conditions of the first radio link used by the first DU node to provide communication between the CU node and the mobile communication device, responsive to determining that the first radio link is temporarily unavailable based on the monitoring, transmit a message to the CU node to inform the CU node that the first radio link is temporarily unavailable, responsive to instructions received from the CU node after transmitting the message, suspend communication between the CU node and the mobile communication device through the first DU node, wherein configuration of the first DU node to serve the mobile communication device using the first radio link is maintained while suspending communication between the CU node and the mobile communication device through the first DU node, after transmitting the message, monitor conditions of the first radio link between the first DU node and the mobile communication device while suspending communication between the CU node and the mobile communication device through the first DU node, responsive to detecting improved conditions over the first radio link, transmit a message to the CU node to inform the CU node that the first radio link is available, and after transmitting the message that the first radio link is available, resume providing communication between the CU node and the mobile communication device through the first DU node using the first radio link and using the configuration of the first DU node maintained while suspending the communication between the CU node and the mobile communication device through the first DU node.

17. The first distributed unit, DU, node of claim 16, wherein maintaining the configuration of the first DU node to serve the mobile communication device using the first radio link comprises maintaining at least one of a Medium Access Control, MAC, configuration, a Radio Link Control, RLC, configuration, a Layer 1, L1, configuration, and/or a Layer 2, L2, configuration while suspending communication between the CU node and the mobile communication device through the first DU node.

18. The first distributed unit, DU, node of claim 16, wherein the processor is further configured to:

responsive to determining that the first radio link is temporarily unavailable based on monitoring the conditions of the first radio link, transmit information to the CU node identifying Protocol Data Units, PDUs, that have not been transmitted over the first radio link to the mobile communication device and/or identifying PDUs that have been transmitted over the first radio link to the mobile communication device.

19. The first distributed unit, DU, node of claim 16, wherein the processor is further configured to:

after transmitting the message that the first radio link is temporarily unavailable, receive instruction from the CU node to flush a Radio Link Control, RLC, buffer for the mobile communication device, and responsive to receiving the instruction, flush the RLC buffer for the mobile communication device.

20. The first distributed unit, DU, node of claim 16, wherein the processor is further configured to:

maintain Packet Data Units, PDUs, in a buffer of the first DU node for the mobile communication device after transmitting the message while suspending communication between the CU node and the mobile communication device through the first DU node, wherein monitoring while suspending communication comprises transmitting one of the PDUs from the buffer for the mobile communication device and detecting improved conditions over the first radio link responsive to success transmitting the one of the PDUs from the buffer.

21. The first distributed unit, DU, node of claim 16, wherein the processor is further configured to:

responsive to determining that the first radio link is temporarily unavailable, discard pending Packet Data Units, PDUs, in a buffer of the first DU node for the mobile communication device.

22. The first distributed unit, DU, node of claim 16, wherein the processor is further configured to:

modify a criteria used to determine that a first radio link is temporarily unavailable responsive to instructions from the CU node.

* * * * *

UNITED STATES PATENT AND TRADEMARK OFFICE
CERTIFICATE OF CORRECTION

| | | |
|---|---|---|
| PATENT NO. | : 10,674,426 B2 | Page 1 of 1 |
| APPLICATION NO. | : 15/765030 | |
| DATED | : June 2, 2020 | |
| INVENTOR(S) | : Centonza et al. | |

It is certified that error appears in the above-identified patent and that said Letters Patent is hereby corrected as shown below:

In the Specification

In Column 2, Line 26, delete "Connectivity" and insert -- Connectivity. --, therefor.

In Column 9, Line 58, delete "DUs" and insert -- DUs. --, therefor.

In Column 11, Lines 28-29, delete "central unit CU node" and insert -- central unit, CU, node --, therefor.

In Column 11, Line 55, delete "DU node 1101" and insert -- DU node 1100 --, therefor.

In Column 11, Line 56, delete "central unit CU node with which DU node 1101" and insert -- central unit, CU, node with which DU node 1100 --, therefor.

In Column 12, Line 61, delete "distributed unit DU node" and insert -- distributed unit, DU, node --, therefor.

In Column 13, Line 38, delete "processor 1101" and insert -- processor 1103 --, therefor.

In Column 13, Line 49, delete "processor 1101" and insert -- processor 1103 --, therefor.

In the Claims

In Column 27, Line 63, in Claim 10, delete "configured to," and insert -- configured to: --, therefor.

In Column 28, Line 12, in Claim 10, delete "node;" and insert -- node, --, therefor.

In Column 28, Line 20, in Claim 10, delete "device; and" and insert -- device, and --, therefor.

Signed and Sealed this
Twelfth Day of January, 2021

Andrei Iancu
*Director of the United States Patent and Trademark Office*